US008797329B2

(12) United States Patent
Goldhor et al.

(10) Patent No.: US 8,797,329 B2
(45) Date of Patent: Aug. 5, 2014

(54) ASSOCIATING BUFFERS WITH TEMPORAL SEQUENCE PRESENTATION DATA

(75) Inventors: Richard S. Goldhor, Belmont, MA (US); Edward J. Bianchi, Bothell, WA (US)

(73) Assignee: EPL Holdings, LLC, Palo Alto, CA (US)

( * ) Notice: Subject to any disclaimer, the term of this patent is extended or adjusted under 35 U.S.C. 154(b) by 0 days.

(21) Appl. No.: 13/454,877

(22) Filed: Apr. 24, 2012

(65) Prior Publication Data

US 2012/0269496 A1 Oct. 25, 2012

Related U.S. Application Data

(60) Division of application No. 13/303,540, filed on Nov. 23, 2011, now Pat. No. 8,570,328, which is a division of application No. 12/716,273, filed on Mar. 3, 2010, now Pat. No. 8,068,108, which is a continuation of application No. 10/919,963, filed on Aug. 17, 2004, now Pat. No. 7,683,903, which is a continuation-in-part of application No. 10/014,894, filed on Dec. 11, 2001, now Pat. No. 6,791,550.

(60) Provisional application No. 60/255,226, filed on Dec. 12, 2000.

(51) Int. Cl.
*G06T 13/00* (2011.01)
*G06F 17/30* (2006.01)

(52) U.S. Cl.
CPC ...... *G06F 17/3002* (2013.01); *G06F 17/30056* (2013.01)
USPC .......................................................... 345/473

(58) Field of Classification Search
CPC .......... G06T 1/20; G06T 13/00; G06T 13/205
USPC .................................................. 345/559, 473
See application file for complete search history.

(56) References Cited

U.S. PATENT DOCUMENTS 3,104,284 A 9/1963 French et al.
3,786,195 A 1/1974 Schiffman
(Continued)

FOREIGN PATENT DOCUMENTS

DE 1258472 1/1968
DE 2939962 A1 5/1980
(Continued)

OTHER PUBLICATIONS

"Presenting Time-Based Media with JMF," Sun Microsystems, Inc., 1998-1999, Available at: http://ditra.cs.umu.se/jmf2_0-guide-html/JMFPresenting.html, 18 p., downloaded Jan. 8, 2013.

(Continued)

*Primary Examiner* — Jeffery A Brier
(74) *Attorney, Agent, or Firm* — Robert Plotkin, P.C.

(57) ABSTRACT

Techniques are provided for managing Presentation Time in a digital rendering system for presentation of temporally-ordered data when the digital rendering system includes a Variable Rate Presentation capability. In one embodiment, Presentation Time is converted to Data Time, and Data Time is reported instead of Presentation Time when only one time can be reported. In another embodiment, a predetermined one of Presentation Time and Data Time is returned in response to a request for a Current Time.

12 Claims, 9 Drawing Sheets

(56) References Cited

U.S. PATENT DOCUMENTS

| | | | |
|---|---|---|---|
| 3,803,363 A | 4/1974 | Lee | |
| 3,816,664 A | 6/1974 | Koch | |
| 4,228,322 A | 10/1980 | Bringol et al. | |
| 4,246,617 A | 1/1981 | Portnoff | |
| 4,370,524 A | 1/1983 | Hiraguri | |
| 4,435,832 A | 3/1984 | Asada et al. | |
| 4,464,784 A | 8/1984 | Agnello | |
| 4,700,391 A | 10/1987 | Leslie, Jr. et al. | |
| 4,757,393 A | 7/1988 | Dakin et al. | |
| 4,792,975 A | 12/1988 | MacKay | |
| 4,833,718 A | 5/1989 | Sprague | |
| 4,864,620 A | 9/1989 | Bialick | |
| 5,113,449 A | 5/1992 | Blanton et al. | |
| 5,131,042 A | 7/1992 | Oda | |
| 5,216,744 A | 6/1993 | Alleyne et al. | |
| 5,341,432 A | 8/1994 | Suzuki et al. | |
| 5,455,910 A | 10/1995 | Johnson et al. | |
| 5,483,468 A | 1/1996 | Chen et al. | |
| 5,524,172 A | 6/1996 | Hamon | |
| 5,583,652 A | 12/1996 | Ware | |
| 5,659,539 A * | 8/1997 | Porter et al. | 709/231 |
| 5,664,044 A | 9/1997 | Ware | |
| 5,692,213 A | 11/1997 | Goldberg et al. | |
| 5,848,239 A | 12/1998 | Ando | |
| 5,893,062 A | 4/1999 | Bhadkamkar et al. | |
| 5,982,431 A | 11/1999 | Chung | |
| 6,065,050 A | 5/2000 | DeMoney | |
| 6,141,001 A | 10/2000 | Baleh | |
| 6,163,646 A | 12/2000 | Tanaka et al. | |
| 6,415,326 B1 | 7/2002 | Gupta et al. | |
| 6,598,228 B2 | 7/2003 | Hejna, Jr. | |
| 6,622,171 B2 | 9/2003 | Gupta et al. | |
| 6,633,339 B1 | 10/2003 | Goto et al. | |
| 6,646,195 B1 | 11/2003 | Puryear | |
| 6,791,550 B2 | 9/2004 | Goldhor et al. | |
| 6,802,019 B1 | 10/2004 | Lauder | |
| 6,975,363 B1 * | 12/2005 | Baldwin et al. | 348/512 |
| 6,985,966 B1 | 1/2006 | Gupta et al. | |
| 7,047,201 B2 | 5/2006 | Chang | |
| 7,096,271 B1 | 8/2006 | Omoigui et al. | |
| 7,237,254 B1 | 6/2007 | Omoigui | |
| 7,302,490 B1 | 11/2007 | Gupta et al. | |
| 7,472,198 B2 | 12/2008 | Gupta et al. | |
| 7,493,011 B2 | 2/2009 | Piesing et al. | |
| 7,565,289 B2 | 7/2009 | Rogers | |
| 7,610,605 B2 | 10/2009 | Negishi et al. | |
| 7,620,294 B2 | 11/2009 | Green et al. | |
| 7,664,558 B2 | 2/2010 | Lindahl et al. | |
| 7,683,903 B2 | 3/2010 | Goldhor | |
| 7,765,315 B2 | 7/2010 | Batson et al. | |
| 7,917,358 B2 | 3/2011 | Rogers | |
| 7,917,360 B2 | 3/2011 | Rogers | |
| 8,244,889 B1 | 8/2012 | Ogdon et al. | |
| 8,311,657 B2 | 11/2012 | Cannistraro et al. | |
| 8,316,147 B2 | 11/2012 | Batson et al. | |
| 8,321,593 B2 | 11/2012 | Bushell et al. | |
| 2002/0038374 A1 | 3/2002 | Gupta et al. | |
| 2006/0221788 A1 | 10/2006 | Lindahl et al. | |
| 2007/0100606 A1 | 5/2007 | Rogers | |
| 2008/0168294 A1 | 7/2008 | Batson et al. | |
| 2008/0168470 A1 | 7/2008 | Bushell et al. | |
| 2008/0222525 A1 | 9/2008 | Cannistraro et al. | |
| 2010/0100212 A1 | 4/2010 | Lindahl et al. | |
| 2010/0257396 A1 | 10/2010 | Batson et al. | |
| 2012/0188254 A1 | 7/2012 | Goldhor | |
| 2012/0195567 A1 | 8/2012 | Goldhor | |
| 2012/0195568 A1 | 8/2012 | Goldhor | |

FOREIGN PATENT DOCUMENTS

| | | |
|---|---|---|
| EP | 0427953 A2 | 5/1991 |
| EP | 1099216 B1 | 4/2004 |
| JP | 60-256987 | 12/1985 |
| JP | 203082 A | 9/1991 |
| WO | 94/18776 A2 | 8/1994 |
| WO | 9631065 A1 | 10/1996 |

OTHER PUBLICATIONS

Richard Menta, "We Test Drive the Creative Nomad Jukebox," Nov. 21, 2000, Available at: www.mp3newswire.net/stories/2000/nomadreview.html, 5 p., downloaded May 6, 2013.

David Malah, "Time-Domain Algorithms for Harmonic Bandwidth Reduction and Time Scaling of Speech Signals," IEEE Transactions on Acoustics, Speech, and Signal Processing, vol. ASSP-27, No. 2, Apr. 1979, p. 121-133.

Donald Joseph Hejna, Jr., "Real-Time Time Scale Modification of Speech via the Synchronized Overlap-Add Algorithm," Massachusetts Institute of Technology, Department of Electrical Engineering and Computer Science, Apr. 1990, 137 p.

Francis Li et al., "Browsing Digital Video," CHI '00 Proceedings of the SIGCHI conference on Human Factors in Computing Systems, Apr. 2000, pp. 169-176.

Barry Arons, "SpeechSkimmer: A System for Interactively Skimming Recorded Speech," ACM Transactions on Computer-Human Interaction, vol. 4, No. 1, Mar. 1997, pp. 3-38.

Stephanie Seneff, "System to Independently Modify Excitation and/or Spectrum of Speech Waveform Without Explicit Pitch Extraction," IEEE Transactions on Acoustics, Speech, and Signal Pkocessing, vol. ASSP-30, No. 4, Aug. 1982, pp. 566-578.

Applications of Digital Signal Processing to Audio and Acoustics, Kluwer Academic Publishers, Mark Kahrs and Karlheinz Brandenburg, editors, published 2002, 286 p.

James L. Wayman et al., "Some Improvements on the Synchronized-Overlap-Add Method of Time Scale Modification for Use in Real-Time Speech Compression and Noise Filtering," IEEE Transactions on Acoustics, Speech. and Signal Processing, vol. 36, No. I , Jan. 1988, pp. 139-140.

Apple Inc. Product Literature, iPod touch Important Product Information Guide, 2011, 16 p.

Apple Inc. Product Literature, QuickTime Initialization Guide, 2004, 10 p.

Apple Inc. Product Literature, iPhone OS Enterprise Deployment Guide, 2010, 90 p.

Apple Inc. Product Literature, Universal Dock, 2010, 88 p.

Apple Inc. Product Literature, Mac mini Quick Start Guide, 2012, 2 p.

Apple Computer, Inc. Product Literature, iBook G4 User's Guide, 2005, 105 p.

Apple Computer, Inc. Product Literature, iPod nano Features Guide, 2006, 60 p.

Apple Inc. Product Literature, iPod shuffle User Guide, 2009, 40 p.

Apple Inc. Product Literature, Audio Codec Services Reference, 2007, 46 p.

Apple Inc. Product Literature, QTCaptureAudioPreviewOutput Class Reference, 2009, 7 p.

Apple Computer, Inc. Product Literature, iMac G5 Hard Drive,17-inch Replacement Instructions, 2005, 17 p.

Apple Inc. Product Literature, AVCaptureStillImageOutput Class Reference, 2011, 9 p.

Apple Inc. Product Literature, iPad Important Product Information Guide, 2012, 12 p.

Apple Inc. Product Literature, Nike + iPod Sensor, 2011, 40 p.

Apple Inc. Product Literature, Welcome to your MacBook, 2011, 92 p.

Apple Inc. Product Literature, Welcome to your Mac Pro, 2011, 136 p.

Apple Inc. Product Literature, Sound Programming Topics for Cocoa, 2012, 12 p.

Apple Inc. Product Literature, Say hello to your Mac mini, 2009, 64 p.

Apple Computer, Inc. Product Literature, Upper Fans, iMac G5, 17-inch Replacement Instructions, 2005, 16 p.

Apple Inc. Product Literature, QuickTime Movie Creation Guide, 2005, 184 p.

(56) References Cited

OTHER PUBLICATIONS

Apple Inc. Product Literature, Welcome to your MacBook Pro, 2011, 88 p.
Apple Inc. Product Literature, Mac mini, 2012, 16 p.
Apple Computer, Inc. Product Literature, iPod Features Guide, 2006, 72 p.
Apple Computer, Inc. Product Literature, MacBook (13-inch) RAM Door (L-Bracket) Replacement Instructions, 2006, 6.
Apple Inc. Product Literature, QTCaptureOutput Class Reference, 2009, 6 p.
Apple Computer, Inc. Product Literature, Power Mac G5 Access Panel Replacement Instructions, 2003, 3 p.
Apple Inc. Product Literature, Mac Pro Solid-State Drive Replacement Instructions, 2010, 7 p.
Apple Inc. Product Literature, NSValue QTKit Additions Reference, 2007, 7 p.
Apple Inc. Product Literature, Video Components Reference for QuickTime, 2006, 143 p.
Apple Inc. Product Literature, QTKit Application Tutorial, 2010, 75 p.
Apple Inc. Product Literature, iPod touch Info, 2012, 2 p.
Apple Inc. Product Literature, QTCaptureFileOutput Class Reference, 2010, 28 p.
Apple Inc. Product Literature, QTCompressionOptions Class Reference, 2009, 10 p.
Apple Inc. Product Literature, Get to know your MacBook Air, 2010, 72 p.
Apple Inc. Product Literature, Mac Pro ATI Radeon Graphics Card Cable Replacement Instructions, 2009, 2 p.
Apple Inc. Product Literature, Apple Core Audio Format Specification 1.0, 2005, 70 p.
Apple Inc. Product Literature, QuickTime Overview, 2004, 34 p.
Apple Inc. Product Literature, Unidentified Document, 2008, 1 p.
Apple Inc. Product Literature, Say hello to your MacBook, 2009, 88 p.
Apple Inc. Product Literature, QuickTime Component Creation Guide, 2005, 41 p.
Apple Computer, Inc. Product Literature, iMac G5 User's Guide, 2005, 96 p.
Apple Inc. Product Literature, MacBook, 2008, 76 p.
Apple Inc. Product Literature, AVMutableMetadataItem Class Reference, 2011, 9 p.
Apple Inc. Product Literature, IMAVButton Class Reference, 2009, 9 p.
Apple Inc. Product Literature, CMAttachment Reference, 2003, 12 p.
Apple Inc. Product Literature, Mac mini, 2010, 76 p.
Apple Inc. Product Literature, CVPixelBufferPool Reference, 2012, 16 p.
Apple Inc. Product Literature, AV Foundation Framework Reference, 2011, 550 p.
Apple Computer, Inc. Product Literature, Your NVIDIA GeForce 7800 GT Graphics Card, 2005, 12 p.
Apple Inc. Product Literature, QTTrack Class Reference, 2009, 25 p.
Apple Inc. Product Literature, Say hello to your MacBook, 2009, 80 p.
Apple Computer, Inc. Product Literature, PowerBook G4 15-inch User's Guide, 2005, 112 p.
Apple Inc. Product Literature, QuickTime Data Types Reference, 2006, 61 p.
Apple Computer, Inc. Product Literature, Power Mac G5 Optical Drive Standoffs Replacement Instructions, 2003, 7 p.
Apple Inc. Product Literature, CVTime Reference, 2010, 14 p.
Apple Inc. Product Literature, iPod nano Armband, 2007, 8 p.
Apple Inc. Product Literature, Welcome to your MacBook Air, 2011, 76 p.
Apple Inc. Product Literature, MacBook Air, 2008, 76 p.
Apple Inc. Product Literature, AV Foundation Constants Reference, 2011, 24 p.
Apple Inc. Product Literature, iPhone Info, 2012, 2 p.
Apple Computer, Inc. Product Literature, Power Mac G5 PCI Card Guide Replacement Instructions, 2003, 6 p.
Apple Computer, Inc. Product Literature, Mac Pro Memory Riser Card Replacement Instructions, 2006, 5 p.
Apple Inc. Product Literature, Mac Pro, 2008, 120 p.
Apple Inc. Product Literature, Welcome to your new iPhone, 2012, 2 p.
Apple Computer, Inc. Product Literature, QuickTime 6.4 User's Guide, 2003, 50 p.
Apple Computer, Inc. Product Literature, eMac User's Guide, 2005, 96 p.
Apple Inc. Product Literature, QTFormatDescription Class Reference, 2009, 10 p.
Apple Inc. Product Literature, Mac Pro PCIe Fan Replacement Instructions, 2009, 4 p.
Apple Computer, Inc. Product Literature, QuickTime Streaming Server, Darwin Streaming Server, Administrator's Guide, 2002, 86 p.
Apple Computer, Inc. Product Literature, Say hello to your MacBook Pro, 2010, 88 p.
Apple Computer, Inc. Product Literature, QuickTime Callbacks Reference, 2006, 17 p.
Apple Inc. Product Literature, MacBook Pro (17-inch, Mid 2010) Hard Drive Replacement Instructions, 2010, 9 p.
Apple Inc. Product Literature, iPod touch Important Product Information Guide, 2008, 20 p.
Apple Inc. Product Literature, Mac Pro Memory DIMMs Replacement Instructions, 2009, 10 p.
Apple Inc. Product Literature, iPad User Guide, 2010, 181 p.
Apple Inc. Product Literature, IMService Class Reference, 2011, 23 p.
Apple Computer, Inc. Product Literature, Power Mac G5 User's Guide, 2004, 112 p.
Apple Inc. Product Literature, iPhone User Guide, 2011, 274 p.
Apple Inc. Product Literature, Core Audio Glossary, 2010, 22 p.
Apple Inc. Product Literature, iPod nano Armband, 2008, 8 p.
Apple Inc. Product Literature, MacBook, 2007, 80 p.
Apple Computer, Inc. Product Literature, Upper Fans, iMac G5, 20-inch Replacement Instructions, 2005, 15 p.
Apple Computer, Inc. Product Literature, MacBook Air Quick Start Guide, 2012, 2 p.
Apple Inc. Product Literature, MacBook Pro, 2007, 80 p.
Apple Inc. Product Literature, CMFormatDescription Reference, 2003, 59 p.
Apple Inc. Product Literature, System Sound Services Reference, 2011, 19 p.
Apple Inc. Product Literature, Say hello to your iMac, 2010, 80 p.
Apple Inc. Product Literature, Mac Pro Bluetooth Cable Replacement Instructions, 2009, 5 p.
Apple Computer, Inc. Product Literature, MacBook Pro User's Guide, 2006, 144 p.
Apple Computer, Inc. Product Literature, MacBook Pro, 2006, 80 p.
Apple Computer, Inc. Product Literature, Mac mini User's Guide, 2006, 98 p.
Apple Computer, Inc. Product Literature, Power Mac G5 Front Panel Board Cable Replacement Instructions, 2004, 6 p.
Apple, Inc. Product Literature, Say hello to your MacBook Pro, 2009 88 p.
Apple Inc. Product Literature, QTCaptureVideoPreviewOutput Class Reference, 2009, 11 p.
Apple Inc. Product Literature, iPad Important Product Information Guide, 2010, 8 p.
Apple Computer, Inc. Product Literature, iMac G5 Memory, 20-inch Replacement Instructions, 2004, 10 p.
Apple Inc. Product Literature, QuickTime Constants Reference, 2006, 92 p.
Apple Inc. Product Literature, CMTime Reference, 2003, 33 p.
Apple Inc. Product Literature, MacBook (13-inch) Memory (DIMMs) Replacement Instructions, 2006, 10 p.
Apple Inc. Product Literature, MacBook Pro Important Product Information Guide, 2012, 16 p.
Apple Inc. Product Literature, MacBook Air Quick Start Guide, 2012, 2 p.
Apple Inc. Product Literature, iMac, 2008, 76 p.

(56) References Cited

OTHER PUBLICATIONS

Apple Inc. Product Literature, Audio Unit Framework Reference, 2011, 132 p.
Apple Inc. Product Literature, Welcome to your MacBook Pro, 2011, 92 p.
Apple Inc. Product Literature, Output Audio Unit Services Reference, 2009, 7 p.
Apple Inc. Product Literature, iPhone Finger Tips, 2008, 2 p.
Apple Computer, Inc. Product Literature, Power Mac G5 AirPort Extreme Card Replacement Instructions, 2004, 7 p.
Apple Inc. Product Literature, iPhone Finger Tips Quick Start Guide, 2011, 2 p.
Apple Inc. Product Literature, CMBlockBuffer Reference, 2012, 25 p.
Apple Inc. Product Literature, Say hello to your MacBook Pro, 2010, 84 p.
Apple Inc. Product Literature, Welcome to your iMac, 2011, 80 p.
Apple Inc. Product Literature, Addendum to Software License Agreement for iLife, 2008, 8 p.
Apple Inc. Product Literature, iPod nano User Guide, 2008, 80 p.
Apple Inc. Product Literature, QTMovie Class Reference, 2010, 94 p.
Apple Inc. Product Literature, iPad Info, 2012, 2 p.
Apple Inc. Product Literature, iPhone 4 Dock, 2010, 40 p.
Apple Inc. Product Literature, iPod classic Quick Start, 2009, 2 p.
Apple Inc. Product Literature, MusicSequence Reference, 2009, 34 p.
Apple Computer, Inc. Product Literature, Power Mac G5 Technology Overview, Oct. 2005, 33 p.
Apple Inc. Product Literature, MusicPlayer Reference, 2009, 18 p.
Apple Inc. Product Literature, AV Foundation Framework Reference for Mac, 2010, 548 p.
Apple Inc. Product Literature, iPod touch User Guide, 2012, 141 p.
Apple Computer, Inc. Product Literature, QuickTime VR Authoring Studio, 1997, 113 p.
Apple Inc. Product Literature, QTCaptureDecompressedVideoOutput Class Reference, 2010, 14 p.
Apple Inc. Product Literature, Mac Pro Solid-State Drive Carrier Adapter Replacement Instructions, 2010, 6 p.
Apple Inc. Product Literature, Core Audio Kit Framework Reference, 2010, 15 p.
Apple Inc. Product Literature, iPod touch User Guide, 2008, 120 p.
Apple Computer, Inc. Product Literature, Your NVIDIA Quadro FX 4500 Graphics Card, 2005, 16 p.
Apple Computer, Inc. Product Literature, iMac G5 Hard Drive, Parallel ATA Replacement Instructions, 2004, 16 p.
Apple Inc. Product Literature, iPod nano User Guide, 2012, 68 p.
Apple Inc. Product Literature, iPod touch User Guide, 2009, 153 p.
Apple Inc. Product Literature, Core Video Reference Collection, 2010, 127 p.
Apple Inc. Product Literature, Mac Pro Processor Cage and Clips Replacement Instructions, 2009, 15 p.
Apple Inc. Product Literature, Mac Pro Memory Riser Card Replacement Instructions, 2008, 5 p.
Apple Inc. Product Literature, AUPannerView Class Reference, 2009, 7 p.
Apple Inc. Product Literature, MacBook Pro, 2008, 80 p.
Apple Inc. Product Literature, iPhone User Guide, 2009, 217 p.
Apple Inc. Product Literature, AVURLAsset Class Reference, 2011, 12 p.
Apple Inc. Product Literature, iMac, 2007, 76 p.
Apple Inc. Product Literature, CVImageBuffer Reference, 2010, 15 p.
Apple Computer, Inc. Product Literature, QuickTime Conferencing H.320/ISDN Installation Guide, 1995, 12 p.
Apple Computer, Inc. Product Literature, Power Mac G5 Optical Drive Replacement Instructions, 2003, 8 p.
Apple Inc. Product Literature, iMac Important Product Information Guide, 2012, 16 p.
Apple Computer, Inc. Product Literature, MacBook Pro Quick Start Guide, 2012, 2 p.
Apple Inc. Product Literature, Say hello to your iMac, 2009, 84 p.
Apple Inc. Product Literature, Core Media Framework Reference, 2010, 198 p.
John Makhoul and Amro El-Jaroudi, "Time-Scale Modification in Medium to Low Rate Speech Coding," Proceedings of ICASSP 86, pp. 1705-1708, Apr. 1986.
E. Hardam, "High Quality Time Scale Modification of Speech Signals Using Fast Synchronized-Overlap-Add Algorithms," ICASSP-90 IEEE International Conference on Acoustics, Speech, and Signal Processing, Apr. 3-6, 1990, vol. 1, pp. 409-412.
Eric Moulines and Francis Charpentier, "Pitch-Synchronous Waveform Processing Techniques for Text-to-Speech Synthesis Using Diphones," Speech Communication, vol. 9, No. 5-6, pp. 453-467. Dec. 1990.
Francis F. Lee, "Time Compression and Expansion of Speech by the Sampling Method," 42nd Convention of the Audio Engineering Society, May 2-5, 1972, 16 p.
Daniel W. Griffin and Jae S. Lim, "Multiband Excitation Vocoder," IEEE Transactions on Acoustics, Speech, and Signal Processing, vol. 36, No. 8, Aug. 1988, pp. 1223-1234.
Michael R. Portnoff, "Implementation of the Digital Phase Vocoder Using the Fast Fourier Transform," IEEE Transactions on Acoustics, Speech and Signal Processing, vol. 24, Issue 3, pp. 243-248, Jun. 1976.
"Frequently Asked Questions . . . About Enounce's 2xAV Plug-In," WayBackMachne Oct. 6, 2000, Available at: web.archive.org/web/20001006205743/http://www.enounce.com/products/real/2xav/FAQ, downloaded Feb. 1, 2013.
Georgios Diamantopolos, Sohail Salehi, John Buechler, "Learning VirtualDub," Packt Publishing, Apr. 2005, 216 p.
Petre Stoica and Arye Nehorai, "On the Asymptotic Distribution of Exponentially Weighted Prediction Error Estimators," IEEE Transactions on Acoustics, Speech, and Signal Processing, vol. 36, No. 1, Jan. 1988, pp. 136-139.
Y. Medan, U. Shvadron, "Asynchronous Rate Conversion," IEEE First Workshop on Multimedia Signal Processing, pp. 107-112, Jun. 23-25, 1997.
John Makhoul, Amro El-Jaroudi, "Time-Scale Modification in Medium to Low Rate Speech Coding," Proceedings of the ICASSP, Apr. 1986, pp. 1705-1708.
Nosa Omoigui, Liwei He, Anoop Gupta, Jonathan Grudin, Elizabeth Sanocki, "Time-Compression: Systems Concerns, Usage, and Benefits," Microsoft Research MSR-TRr-98-63, Nov. 11, 1998.
Masanobu Abe, Shin'ichi Tamura, Hisao Kuwabara, "A New Speech Modification Method by Signal Reconstruction," ICASSP-89 International Conference on Acoustics, Speech, and Signal Processing, May 23-26, 1989, vol. 1, pp. 592-595.
James L. Wayman, R. Eric Reinke, Dennis L. Wilson, "High Quality Speech Expansion, Compression, and Noise Filtering Using the Sola Method of Time Scale Modification," 23rd Asilomar Conference on Signals, Systems, and Computers, Oct. 30-Nov. 1, 1989, vol. 2, pp. 714-717.
"Inside Macintosh: QuickTime," Apple Technical Library, Addison-Wesley Publishing Company, published 1993, 725 p.
Richard V. Cox, Ronald E. Crochiere, James D. Johnston, "Real-Time Implementation of Time Domain Harmonic Scaling of Speech for Rate Modification and Coding," IEEE Journal of Solid-State Circuits, vol. SC-18, No. 1, Feb. 1983, pp. 10-24.
Defendant's, Apple Inc., Invalidity Contentions, *EPL Holdings, LLC v. Apple Inc.*, United States District Court, Northern District of California, San Francisco Division, Case No. 3:12-cv-04306 (JST), filed May 16, 2013.
Defendant's, Apple Inc., Invalidity Contentions, *EPL Holdings, LLC v. Apple Inc.*, Exhibit A-1, Case No. 3:12-cv-04306 (JST), filed May 16, 2013, Invalidity of U.S. Patent No. 5,175,769: Fairbanks, Everitt, Jaeger, "Method for Time or Frequency Compression-Expansion of Speech," Transactions of the IRE Professional Group on Audio, vol. 2, No. 1 (Jan. 1954), pp. 7-12 and Francis F. Lee, "Time Compression and Expansion of Speech by the Sampling Method," JAES vol. 20, No. 9, pp. 738-742 (Nov. 1972).

(56) References Cited

OTHER PUBLICATIONS

Defendant's, Apple Inc., Invalidity Contentions, *EPL Holdings, LLC v. Apple Inc.*, Exhibit A-2, Case No. 3:12-cv-04306 (JST), filed May 16, 2013, Invalidity of U.S. Patent No. 5,175,769: Malah, "Time Domain Algorithms for Time Scale Variation of Speech Signals," Technion I.I.T., E.E., Pub. 280 (May 1976).

Defendant's, Apple Inc., Invalidity Contentions, *EPL Holdings, LLC v. Apple Inc.*, Exhibit A-3, Case No. 3:12-cv-04306 (JST), filed May 16, 2013, Invalidity of U.S. Patent No. 5,175,769: David Malah, "Time-Domain Algorithms for Harmonic Bandwidth Reduction and Time Scaling of Speech Signals," IEEE Transactions on Acoustics, Speech, and Signal Processing, vol. ASSP-27, No. 2, pp. 121-133 (Apr. 1979).

Defendant's, Apple Inc., Invalidity Contentions, *EPL Holdings, LLC v. Apple Inc.*, Exhibit A-4, Case No. 3:12-cv-04306 (JST), filed May 16, 2013, Invalidity of U.S. Patent No. 5,175,769: Bringol et al., U.S. Patent No. 4,228,322.

Defendant's, Apple Inc., Invalidity Contentions, *EPL Holdings, LLC v. Apple Inc.*, Exhibit A-5, Case No. 3:12-cv-04306 (JST), filed May 16, 2013, Invalidity of U.S. Patent No. 5,175,769: Cox, Crochiere, Johnston, "Real-Time Implementation of Time Domain Harmonic Scaling of Speech for Rate Modification and Coding," IEEE J. of Solid-State Circuits, vol. SC-18, No. 1 (Feb. 1983), pp. 10-24.

Defendant's, Apple Inc., Invalidity Contentions, *EPL Holdings, LLC v. Apple Inc.*, Exhibit A-6, Case No. 3:12-cv-04306 (JST), filed May 16, 2013, Invalidity of U.S. Patent No. 5,175,769: Roucos and Wilgus, "High Quality Time-Scale Modification for Speech," Acoustics, Speech, and Signal Processing, IEEE International Conference on ICASSP, vol. 10 (1985), pp. 493-496.

Defendant's, Apple Inc., Invalidity Contentions, *EPL Holdings, LLC v. Apple Inc.*, Exhibit A-7, Case No. 3:12-cv-04306 (JST), filed May 16, 2013, Invalidity of U.S. Patent No. 5,175,769: Roucos and Wilgus, "The Waveform Segment Vocoder: A New Approach for Very-Low-Rate Speech Coding," Acoustics, Speech, and Signal Processing, IEEE International Conference on ICASSP, pp. 236-239 (1985).

Defendant's, Apple Inc., Invalidity Contentions, *EPL Holdings, LLC v. Apple Inc.*, Exhibit A-8, Case No. 3:12-cv-04306 (JST), filed May 16, 2013, Invalidity of U.S. Patent No. 5,175,769: Charpentier and Stella, "Diphone Synthesis Using an Overlap-Add Technique for Speech Waveforms Concatenation," Acoustics, Speech, and Signal Processing, IEEE International Conference on ICASSP (1986), vol. 11, pp. 2015-2018.

Defendant's, Apple Inc., Invalidity Contentions, *EPL Holdings, LLC v. Apple Inc.*, Exhibit A-9, Case No. 3:12-cv-04306 (JST), filed May 16, 2013, Invalidity of U.S. Patent No. 5,175,769: Makhoul and El-Jaroudi, "Time-Scale Modification in Medium to Low Rate Speech Coding," Acoustics, Speech, and Signal Processing, IEEE Int'l Conference on ICASSP, vol. 11, pp. 1705-1708 (1986).

Defendant's, Apple Inc., Invalidity Contentions, *EPL Holdings, LLC v. Apple Inc.*, Exhibit A-10, Case No. 3:12-cv-04306 (JST), filed May 16, 2013, Invalidity of U.S. Patent No. 5,175,769: Wayman and Wilson, "Some Improvements on the Synchronized-Overlap-Add Method of Time Scale Modification for Use in Real-Time Speech Compression and Noise Filtering," IEEE Transactions on Acoustics, Speech, and Signal Processing, vol. 36, No. 1, pp. 139-140 (Jan. 1988).

Defendant's, Apple Inc., Invalidity Contentions, *EPL Holdings, LLC v. Apple Inc.*, Exhibit A-11, Case No. 3:12-cv-04306 (JST), filed May 16, 2013, Invalidity of U.S. Patent No. 5,175,769: Jones and Parks, "Generation and Combination of Grains for Music Synthesis," Computer Music Journal, vol. 12, No. 2 (Summer 1988), pp. 27-34.

Defendant's, Apple Inc., Invalidity Contentions, *EPL Holdings, LLC v. Apple Inc.*, Exhibit A-12, Case No. 3:12-cv-04306 (JST), filed May 16, 2013, Invalidity of U.S. Patent No. 5,175,769: Bialick, U.S. Patent No. 4,864,620 (issued Sep. 5, 1989).

Defendant's, Apple Inc., Invalidity Contentions, *EPL Holdings, LLC v. Apple Inc.*, Exhibit A-13, Case No. 3:12-cv-04306 (JST), filed May 16, 2013, Invalidity of U.S. Patent No. 5,175,769: Hamon, Moulines, Charpentier, "A Diphone Synthesis System Based on Time-Domain Prosodic Modification of Speech," Acoustics, Speech, and Signal Processing (1989), pp. 238-241.

Defendant's, Apple Inc., Invalidity Contentions, *EPL Holdings, LLC v. Apple Inc.*, Exhibit A-14, Case No. 3:12-cv-04306 (JST), filed May 16, 2013, Invalidity of U.S. Patent No. 5,175,769: Wayman, Reinke, and Wilson, "High Quality Speech Expansion, Compression, and Noise Filtering Using the SOLA Method of Time Scale Modification," Twenty-Third Asilomar Conference on Signals, Systems and Computers, vol. 2, pp. 714-717 (1989).

Defendant's, Apple Inc., Invalidity Contentions, *EPL Holdings, LLC v. Apple Inc.*, Exhibit A-15, Case No. 3:12-cv-04306 (JST), filed May 16, 2013, Invalidity of U.S. Patent No. 5,175,769: Moulines and Charpentier, "Pitch-Synchronous Waveform Processing Techniques for Text-To-Speech Synthesis Using Diphones," Speech Communication 9 (1990) 453-467.

Defendant's, Apple Inc., Invalidity Contentions, *EPL Holdings, LLC v. Apple Inc.*, Exhibit A-16, Case No. 3:12-cv-04306 (JST), filed May 16, 2013, Invalidity of U.S. Patent No. 5,175,769: Hardam, "High Quality Time Scale Modification of Speech Signals Using Fast Synchronized-Overlap-Add Algorithms," 1990 International Conference on Acoustics, Speech, and Signal Processing, IEEE, vol. 1, pp. 409-412 (Apr. 1990).

Defendant's, Apple Inc., Invalidity Contentions, *EPL Holdings, LLC v. Apple Inc.*, Exhibit A-17, Case No. 3:12-cv-04306 (JST), filed May 16, 2013, Invalidity of U.S. Patent No. 5,175,769: Alleyne et al., U.S. Patent No. 5,216,744 (filed Mar. 21, 1991).

Defendant's, Apple Inc., Invalidity Contentions, *EPL Holdings, LLC v. Apple Inc.*, Exhibit A-18, Case No. 3:12-cv-04306 (JST), filed May 16, 2013, Invalidity of U.S. Patent No. 5,175,769: Suzuki et al., U.S. Patent No. 5,341,432.

Defendant's, Apple Inc., Invalidity Contentions, *EPL Holdings, LLC v. Apple Inc.*, Exhibit B-1, Case No. 3:12-cv-04306 (JST), filed May 16, 2013, Invalidity of U.S. Patent No. 7,683,903: Winamp 2.03 ("Winamp203").

Defendant's, Apple Inc., Invalidity Contentions, *EPL Holdings, LLC v. Apple Inc.*, Exhibit B-2, Case No. 3:12-cv-04306 (JST), filed May 16, 2013, Invalidity of U.S. Patent No. 7,683,903: PaceMaker Plugin with Winamp 2.5e ("PaceMaker").

Defendant's, Apple Inc., Invalidity Contentions, *EPL Holdings, LLC v. Apple Inc.*, Exhibit B-3, Case No. 3:12-cv-04306 (JST), filed May 16, 2013, Invalidity of U.S. Patent No. 7,683,903: Roni Music's "Slow Me Down" Plugin with Winamp 2.5e ("SlowMeDown").

Defendant's, Apple Inc., Invalidity Contentions, *EPL Holdings, LLC v. Apple Inc.*, Exhibit B-4, Case No. 3:12-cv-04306 (JST), filed May 16, 2013, Invalidity of U.S. Patent No. 7,683,903: Cool Edit 2000 for Windows ("CoolEdit").

Defendant's, Apple Inc., Invalidity Contentions, *EPL Holdings, LLC v. Apple Inc.*, Exhibit B-5, Case No. 3:12-cv-04306 (JST), filed May 16, 2013, Invalidity of U.S. Patent No. 7,683,903: Microsoft Research's "Enhanced Browser".

Defendant's, Apple Inc., Invalidity Contentions, *EPL Holdings, LLC v. Apple Inc.*, Exhibit B-6, Case No. 3:12-cv-04306 (JST), filed May 16, 2013, Invalidity of U.S. Patent No. 7,683,903: Microsoft Research Time Compression System ("MS Time Compression System").

Defendant's, Apple Inc., Invalidity Contentions, *EPL Holdings, LLC v. Apple Inc.*, Exhibit B-7, Case No. 3:12-cv-04306 (JST), filed May 16, 2013, Invalidity of U.S. Patent No. 7,683,903: United States Patent Application Publication No. 2002/0038374 ("374 Publication").

Defendant's, Apple Inc., Invalidity Contentions, *EPL Holdings, LLC v. Apple Inc.*, Exhibit B-8, Case No. 3:12-cv-04306 (JST), filed May 16, 2013, Invalidity of U.S. Patent No. 7,683,903: U.S. Pat. No. 7,237,254 ("Omoigui").

Defendant's, Apple Inc., Invalidity Contentions, *EPL Holdings, LLC v. Apple Inc.*, Exhibit B-9, Case No. 3:12-cv-04306 (JST), filed May 16, 2013, Invalidity of U.S. Patent No. 7,683,903: QuickTime Prior Systems ("QuickTime Prior Systems").

Defendant's, Apple Inc., Invalidity Contentions, *EPL Holdings, LLC v. Apple Inc.*, Exhibit B-10, Case No. 3:12-cv-04306 (JST), filed May 16, 2013, Invalidity of U.S. Patent No. 7,683,903: Transcribe! Software v. 2.0 ("Transcribe!").

(56) References Cited

OTHER PUBLICATIONS

Defendant's, Apple Inc., Invalidity Contentions, *EPL Holdings, LLC v. Apple Inc.*, Exhibit B-11, Case No. 3:12-cv-04306 (JST), filed May 16, 2013, Invalidity of U.S. Patent No. 7,683,903: U.S. Patent No. 5,583,652 ("Ware").
Defendant's, Apple Inc., Invalidity Contentions, *EPL Holdings, LLC v. Apple Inc.*, Exhibit B-12, Case No. 3:12-cv-04306 (JST), filed May 16, 2013, Invalidity of U.S. Patent No. 7,683,903: Denon MiniDisc Recorder DN-M991R ("Denon").
Defendant's, Apple Inc., Invalidity Contentions, *EPL Holdings, LLC v. Apple Inc.*, Exhibit B-13, Case No. 3:12-cv-04306 (JST), filed May 16, 2013, Invalidity of U.S. Patent No. 7,683,903: U.S. Patent No. 6,985,966 ("Gupta").
Defendant's, Apple Inc., Invalidity Contentions, *EPL Holdings, LLC v. Apple Inc.*, Exhibit B-14, Case No. 3:12-cv-04306 (JST), filed May 16, 2013, Invalidity of U.S. Patent No. 7,683,903: Nomad Jukebox.
Defendant's, Apple Inc., Invalidity Contentions, *EPL Holdings, LLC v. Apple Inc.*, Exhibit B-15, Case No. 3:12-cv-04306 (JST), filed May 16, 2013, Invalidity of U.S. Patent No. 7,683,903: SpeechSkimmer.
Defendant's, Apple Inc., Invalidity Contentions, *EPL Holdings, LLC v. Apple Inc.*, Exhibit C-1, Case No. 3:12-cv-04306 (JST), filed May 16, 2013, Invalidity of U.S. Patent No. 8,345,050: Winamp 2.03 ("Winamp203").
Defendant's, Apple Inc., Invalidity Contentions, *EPL Holdings, LLC v. Apple Inc.*, Exhibit C-2, Case No. 3:12-cv-04306 (JST), filed May 16, 2013, Invalidity of U.S. Patent No. 8,345,050: PaceMaker Plugin with Winamp 2.5e ("PaceMaker").
Defendant's, Apple Inc., Invalidity Contentions, *EPL Holdings, LLC v. Apple Inc.*, Exhibit C-3, Case No. 3:12-cv-04306 (JST), filed May 16, 2013, Invalidity of U.S. Patent No. 8,345,050: Roni Music's "Slow Me Down".
Defendant's, Apple Inc., Invalidity Contentions, *EPL Holdings, LLC v. Apple Inc.*, Exhibit C-4, Case No. 3:12-cv-04306 (JST), filed May 16, 2013, Invalidity of U.S. Patent No. 8,345,050: Cool Edit 2000 for Windows ("CoolEdit").
Defendant's, Apple Inc., Invalidity Contentions, *EPL Holdings, LLC v. Apple Inc.*, Exhibit C-5, Case No. 3:12-cv-04306 (JST), filed May 16, 2013, Invalidity of U.S. Patent No. 8,345,050: Microsoft Research's "Enhanced Browser".
Defendant's, Apple Inc., Invalidity Contentions, *EPL Holdings, LLC v. Apple Inc.*, Exhibit C-6, Case No. 3:12-cv-04306 (JST), filed May 16, 2013, Invalidity of U.S. Patent No. 8,345,050: Microsoft Research Time Compression System ("MS Time Compression System").
Defendant's, Apple Inc., Invalidity Contentions, *EPL Holdings, LLC v. Apple Inc.*, Exhibit C-7, Case No. 3:12-cv-04306 (JST), filed May 16, 2013, Invalidity of U.S. Patent No. 8,345,050: United States Patent Application Publication No. 2002/0038374 ("374 Publication").
Defendant's, Apple Inc., Invalidity Contentions, *EPL Holdings, LLC v. Apple Inc.*, Exhibit C-8, Case No. 3:12-cv-04306 (JST), filed May 16, 2013, Invalidity of U.S. Patent No. 8,345,050: U.S. Pat. No. 7,237,254 ("Omoigui").
Defendant's, Apple Inc., Invalidity Contentions, *EPL Holdings, LLC v. Apple Inc.*, Exhibit C-9, Case No. 3:12-cv-04306 (JST), filed May 16, 2013, Invalidity of U.S. Patent No. 8,345,050: QuickTime Prior Systems ("QuickTime Prior System").
Defendant's, Apple Inc., Invalidity Contentions, *EPL Holdings, LLC v. Apple Inc.*, Exhibit C-10, Case No. 3:12-cv-04306 (JST), filed May 16, 2013, Invalidity of U.S. Patent No. 8,345,050: Transcribe! Software v. 2.0 ("Transcribe!").
Defendant's, Apple Inc., Invalidity Contentions, *EPL Holdings, LLC v. Apple Inc.*, Exhibit C-11, Case No. 3:12-cv-04306 (JST), filed May 16, 2013, Invalidity of U.S. Patent No. 8,345,050: U.S. Patent No. 5,583,652 ("Ware").
Defendant's, Apple Inc., Invalidity Contentions, *EPL Holdings, LLC v. Apple Inc.*, Exhibit C-12, Case No. 3:12-cv-04306 (JST), filed May 16, 2013, Invalidity of U.S. Patent No. 8,345,050: Denon MiniDisc Recorder DN-M991R ("Denon").
Defendant's, Apple Inc., Invalidity Contentions, *EPL Holdings, LLC v. Apple Inc.*, Exhibit C-13, Case No. 3:12-cv-04306 (JST), filed May 16, 2013, Invalidity of U.S. Patent No. 8,345,050: U.S. Patent No. 6,985,966 ("Gupta").
Defendant's, Apple Inc., Invalidity Contentions, *EPL Holdings, LLC v. Apple Inc.*, Exhibit C-14, Case No. 3:12-cv-04306 (JST), filed May 16, 2013, Invalidity of U.S. Patent No. 8,345,050: Nomad Jukebox.
Defendant's, Apple Inc., Invalidity Contentions, *EPL Holdings, LLC v. Apple Inc.*, Exhibit C-15, Case No. 3:12-cv-04306 (JST), filed May 16, 2013, Invalidity of U.S. Patent No. 8,345,050: SpeechSkimmer.
Defendant's, Apple Inc., Invalidity Contentions, *EPL Holdings, LLC v. Apple Inc.*, Exhibit D-1, Case No. 3:12-cv-04306 (JST), filed May 16, 2013, Invalidity of U.S. Patent No. 8,384,720: Winamp 2.03 ("Winamp203").
Defendant's, Apple Inc., Invalidity Contentions, *EPL Holdings, LLC v. Apple Inc.*, Exhibit D-2, Case No. 3:12-cv-04306 (JST), filed May 16, 2013, Invalidity of U.S. Patent No. 8,384,720: PaceMaker Plugin with Winamp 2.5e ("PaceMaker").
Defendant's, Apple Inc., Invalidity Contentions, *EPL Holdings, LLC v. Apple Inc.*, Exhibit D-3, Case No. 3:12-cv-04306 (JST), filed May 16, 2013, Invalidity of U.S. Patent No. 8,384,720: Roni Music's "Slow Me Down" Plugin with Winamp 2.5e ("SlowMeDown").
Defendant's, Apple Inc., Invalidity Contentions, *EPL Holdings, LLC v. Apple Inc.*, Exhibit D-4, Case No. 3:12-cv-04306 (JST), filed May 16, 2013, Invalidity of U.S. Patent No. 8,384,720: Cool Edit 2000 for Windows ("CoolEdit").
Defendant's, Apple Inc., Invalidity Contentions, *EPL Holdings, LLC v. Apple Inc.*, Exhibit D-5, Case No. 3:12-cv-04306 (JST), filed May 16, 2013, Invalidity of U.S. Patent No. 8,384,720: Microsoft Research's "Enhanced Browser".
Defendant's, Apple Inc., Invalidity Contentions, *EPL Holdings, LLC v. Apple Inc.*, Exhibit D-6, Case No. 3:12-cv-04306 (JST), filed May 16, 2013, Invalidity of U.S. Patent No. 8, 384,720: Microsoft Research Time Compression System ("MS Time Compression System").
Defendant's, Apple Inc., Invalidity Contentions, *EPL Holdings, LLC v. Apple Inc.*, Exhibit D-7, Case No. 3:12-cv-04306 (JST), filed May 16, 2013, Invalidity of U.S. Patent No. 8,384,720: United States Patent Application Publication No. 2002/0038374 ("374 Publication").
Defendant's, Apple Inc., Invalidity Contentions, *EPL Holdings, LLC v. Apple Inc.*, Exhibit D-8, Case No. 3:12-cv-04306 (JST), filed May 16, 2013, Invalidity of U.S. Patent No. 8,384,720: U.S. Pat. No. 7,237,254 ("Omoigui").
Defendant's, Apple Inc., Invalidity Contentions, *EPL Holdings, LLC v. Apple Inc.*, Exhibit D-9, Case No. 3:12-cv-04306, filed May 16, 2013, Invalidity of U.S. Patent No. 8,384,720: QuickTime Prior Systems ("QuickTime Prior System").
Defendant's, Apple Inc., Invalidity Contentions, *EPL Holdings, LLC v. Apple Inc.*, Exhibit D-10, Case No. 3:12-cv-04306 (JST), filed May 16, 2013, Invalidity of U.S. Patent No. 8,384,720: Transcribe! Software v. 2.0 ("Transcribe!").
Defendant's, Apple Inc., Invalidity Contentions, *EPL Holdings, LLC v. Apple Inc.*, Exhibit D-11, Case No. 3:12-cv-04306 (JST), filed May 16, 2013, Invalidity of U.S. Patent No. 8,384,720: U.S. Patent No. 5,583,652 ("Ware").
Defendant's, Apple Inc., Invalidity Contentions, *EPL Holdings, LLC v. Apple Inc.*, Exhibit D-12, Case No. 3:12-cv-04306 (JST), filed May 16, 2013, Invalidity of U.S. Patent No. 8,384,720: Denon, MiniDisc Recorder DN-M991R.
Defendant's, Apple Inc., Invalidity Contentions, *EPL Holdings, LLC v. Apple Inc.*, Exhibit D-13, Case No. 3:12-cv-04306 (JST), filed May 16, 2013, Invalidity of U.S. Patent No. 8,384,720: U.S. Patent No. 6,985,966 ("Gupta").
Defendant's, Apple Inc., Invalidity Contentions, *EPL Holdings, LLC v. Apple Inc.*, Exhibit D-14, Case No. 3:12-cv-04306 (JST), filed May 16, 2013, Case No. 3:12-cv-04306 (JST), filed May 16, 2013, Invalidity of U.S. Patent No. 8,384,720: Nomad Jukebox.
Defendant's, Apple Inc., Invalidity Contentions, *EPL Holdings, LLC v. Apple Inc.*, Exhibit D-15, Case No. 3:12-cv-04306 (JST), filed May 16, 2013, Invalidity of U.S. Patent No. 8,384,720: SpeechSkimmer.
Apple Computer, Inc. Product Literature, iBook G4, Getting Started, 2004, 108 p.

(56) References Cited

OTHER PUBLICATIONS

Apple Inc. Product Literature, QTDataReference Class Reference, 2009, 16 p.
Apple Computer, Inc. Product Literature, iPod Hi-Fi, 2006, 12 p.
Apple Inc. Product Literature, Say hello to your MacBook Pro, 2009, 88 p.
Apple Inc. Product Literature, NSSound Class Reference, 2009, 26 p.
Apple Computer, Inc. Product Literature, iMac G5 AirPort Extreme Card, 20-inch Replacement Instructions, 2004, 11 p.
Apple Inc. Product Literature, iMac User's Guide, 2007, 104 p.
Apple Inc. Product Literature, AVAssetWriterInput Class Reference, 2011, 15 p.
Apple Computer, Inc. Product Literature, QuickTime Movie Basics, 2005, 87 p.
Apple Inc. Product Literature, Mac Pro User's Guide, 2007, 92 p.
Apple Inc. Product Literature, Say hello to your Mac mini, 2009, 76 p.
Apple Computer, Inc. Product Literature, Access Panel Replacement Instructions, 2006, 3 p.
Apple Inc. Product Literature, Welcome to your iMac., 2011, 88 p.
Apple, Inc. Product Literature, iPod nano User Guide, 2009, 104 p.
Apple Computer, Inc. Product Literature, Power Mac G5 Battery Replacement Instructions, 2004, 7 p.
Apple Inc. Product Literature, iPod touch Important Product Information Guide, 2008, 12 p.
Apple Inc. Product Literature, CMSampleBuffer Reference, 2003, 33 p.
Apple Inc. Product Literature, Say hello to your iMac, 2009, 76 p.
Apple Inc. Product Literature, Audio Toolbox Framework Reference, 2010, 261 p.
Apple Computer, Inc. Product Literature, QuickTime 7 User's Guide, 2005, 62 p.
Apple Inc. Product Literature, iPhone 3G, 2009, 28 p.
Apple Computer, Inc. Product Literature, iMac 24-inch VESA Mount Adapter, 2006, 60 p.
Apple Inc. Product Literature, RAID Battery Handling Instructions, 2007, 1 p.
Apple Inc. Product Literature, CVBuffer Reference, 2010, 14 p.
Apple Inc. Product Literature, AVAsset Class Reference, 2011, 23 p.
Apple Inc. Product Literature, iPad User Guide, 2011, 198 p.
Apple Computer, Inc. Product Literature, Mac Pro Optical Drive Carrier Replacement Instructions, 2006, 7 p.
Apple Inc. Product Literature, Extended Audio File Services Reference, 2011, 26 p.
Apple Inc. Product Literature, Audio Converter Services Reference, 2011, 34 p.
Apple Inc. Product Literature, CVDisplayLink Reference, 2010, 21 p.
Apple Inc. Product Literature, Audio File Services Reference, 2011, 72 p.
Apple Inc. Product Literature, iPod nano User Guide, 2011, 66 p.
Apple Computer, Inc. Product Literature, Inverter, 20-inch Replacement Instructions, 2005, 22 p.
Apple, Inc. Product Literature, Audio Queue Services Programming Guide, 2007, 63 p.
Apple Inc. Product Literature, QTKit Framework Reference, 2004, 331 p.
Apple Inc. Product Literature, Composite AV Cable, 2010, 16 p.
Apple Inc. Product Literature, Nike + iPod User Guide, 2011, 32 p.
Apple Inc. Product Literature, iPhone Quick Start Guide, 2011, 2 p.
Apple Inc. Product Literature, CVOpenGLBuffer Reference, 2010, 10 p.
Apple Inc. Product Literature, Say hello to your Mac mini, 2010, 76 p.
Apple Inc. Product Literature, iPod nano Features Guide, 2008, 72 p.
Apple Inc. Product Literature, MusicTrack Reference, 2009, 33 p.
Apple Inc. Product Literature, QTCaptureConnection Class Reference, 2009, 14 p.
Apple Inc. Product Literature, USB PowerAdapter, 2008, 16 p.
Apple Inc. Product Literature, iPad User Guide, 2013, 137 p.
Apple Inc. Product Literature, Component AV Cable, 2010, 16 p.
Apple Inc. Product Literature, Audio Unit Processing Graph Services Reference, 2009, 37 p.
Apple Inc. Product Literature, iPod classic User Guide, 2012, 58 p.
Apple Computer, Inc. Product Literature, iMac Computer, 2006, 76 p.
Apple Inc. Product Literature, iPod touch Important Product Information Guide, 2009, 12 p.
Apple Inc. Product Literature, MacBook, 2007, 76 p.
Apple Inc. Product Literature, AUCustomViewPersistentData Protocol Reference, 2009, 6 p.
Apple Computer, Inc. Product Literature, Mac Pro Battery Replacement Instructions, 2006, 5 p.
Apple Inc. Product Literature, QuickTime File Format Specification, 2004, 446 p.
Apple Inc. Product Literature, iMac Quick Start Guide, 2013, 2 p.
Apple Inc. Product Literature, Mac Pro Graphics Cards with Booster Cable Replacement Instructions, 2006, 6 p.
Apple Computer, Inc. Product Literature, Mac mini User's Guide, 2005, 106 p.
Apple Inc. Product Literature, iPod touch User Guide, 2008, 122 p.
Apple Inc. Product Literature, CMSync Reference, 2013, 27 p.
Apple Inc. Product Literature, Finger Tips—iPhone Quick Start Guide, 2009, 2 p.
Apple Inc. Product Literature, CMTimeRange Reference, 2003, 22 p.
Apple Computer, Inc. Product Literature, iPod USB Power Adapter, 2006, 20 p.
Apple Inc. Product Literature, Mac Pro Memory (FB-DIMM) Replacement Instructions, 2008, 6 p.
Apple Inc. Product Literature, AV Foundation Programming Guide, 2011, 63 p.
Apple Inc. Product Literature, AVCaptureOutput Class Reference, 2011, 7 p.
Apple Inc. Product Literature, QuickTime 7.3 User's Guide, 2007, 63 p.
Apple Inc. Product Literature, Mac Mini OS X Lion, 2011, 84 p.
Apple Inc. Product Literature, QTCaptureMovieFileOutput Class Reference, 2009, 5 p.
Apple Computer, Inc. Product Literature, QuickTime Conferencing ISDN Kit Hardware Installation Manual, 1996, 19 p.
Apple Computer, Inc. Product Literature, PowerBook G4 17-inch User's Guide, 2005, 112 p.
Apple Inc. Product Literature, Audio Unit Properties Reference, 2012, 70 p.
Apple Inc. Product Literature, Audio Toolbox Debugging Reference, 2009, 7 p.
Apple Inc. Product Literature, Audio File Stream Services Reference, 2011, 24 p.
Apple Inc. Product Literature, Audio Hardware Services Reference, 2011, 13 p.
Apple Computer, Inc. Product Literature, iMac G5 AirPort Extreme Card, 17-inch Replacement Instructions, 2004, 12 p.
Apple Inc. Product Literature, QTKit Constants Reference, 2010, 9 p.
Apple Inc. Product Literature, QTCaptureInput Class Reference, 2009, 6 p.
Pro Tools DigiRack Plug-Ins Guide, Version 5.0.1 for Macintosh and Windows, Digidesign Inc., 2000, 68 p.
Nullsoft WinAmp, www.winamp.com, WayBackMachine May 11, 2000, 2 pp., available online at web.archive.org/web/20000511115635/http://www.winamp.com/customize/detail.jhtml?componentId=12689, downloaded May 15, 2013.
Pro Tools Reference Guide, Version 5.0.1 for Macintosh and Windows, Digidesign Inc., 1999, 432 pp.
"Syntrillium Releases Two Product Updates," WayBackMachine, Aug. 16, 2000, 2 pp., available online at web.archive.org/web/20000816064136/http://www.harmony-central.com/Newp/2000/updates.html, downloaded May 15, 2013.
Apple Inc. Product Literature, CoreMedia Framework Data Types Reference, 2010, 6 pp.
Apple Inc. Product Literature, iPod Important Product Information, date unknown, 6 p.
Apple Inc. Product Literature, MacBook Pro Battery, date unknown, 2 p.

(56) References Cited

OTHER PUBLICATIONS

Apple Inc. Product Literature, MacBook Pro Take Apart—Memory, date unknown, 6 p.
Screenshot of Pacemaker v1.1, date unknown.
Screenshot of Winamp Pitch/Tempo Control, date unknown.
Denon Minidisc Recorder DN-M991R Operating Instructions, date unknown.
Apple Inc. Product Literature, MacBook Air SuperDrive, 2008, 8 p.
Apple Inc. Product Literature, Data Components Reference for QuickTime, 2006, 128 p.
Apple Inc. Product Literature, Core Audio Data Types Reference, 2011, 90 p.
Apple Computer, Inc. Product Literature, 17-inch MacBook Pro User's Guide, 2006, 144 p.
Apple Inc. Product Literature, EarPods with Remote and Mic, 2012, 40 p.
Apple Computer, Inc. Product Literature, eMac User's Guide, 2004, 88 p.
Apple Inc. Product Literature, QuickTime 7.2 User's Guide, 2007, 61 p.
Apple Inc. Product Literature, QTCaptureLayer Class Reference, 2009, 7 p.
Apple Computer, Inc. Product Literature, iMac G5 Backup Battery Replacement Instructions, 2005, 18 p.
Apple Inc. Product Literature, CVOpenGLTexture Reference, 2010, 10 p.
Apple Inc. Product Literature, Earphones with Remote and Mic, 2010, 36 p.
Apple Computer, Inc. Product Literature, iMac User's Guide, 2006, 120 p.
Apple Inc. Product Literature, Say hello to your Mac Pro, 2009, 124 p.
Apple Computer, Inc. Product Literature, iPod User's Guide, 2005, 77 p.
Apple Inc. Product Literature, QTCaptureSession Class Reference, 2009, 11 p.
Apple Computer, Inc. Product Literature, iPod mini User's Guide, 2005, 63 p.
Apple Inc. Product Literature, Welcome to your Mac Pro, 2012, 136 p.
Apple Computer, Inc. Product Literature, iPod shuffle User's Guide, 2005, 32 p.
Apple Inc. Product Literature, iPad User Guide, 2012, 144 p.
Apple Inc. Product Literature, Core Media Constants Reference, 2010, 5 p.
Apple Computer, Inc. Product Literature, QuickTime 6.3 + 3GPP, 2003, 47 p.
Apple Inc. Product Literature, MacBook Pro, 2007, 84 p.
Apple Inc. Product Literature, QuickTime Guide for Windows, 2005, 49 p.
Apple Inc. Product Literature, Image Codec Reference for QuickTime, 2006, 144 p.
Apple Inc. Product Literature, AUGenericView Class Reference, 2009, 9 p.
Apple Inc. Product Literature, AVAssetExportSession Class Reference, 2012, 22 p.
Apple Computer, Inc. Product Literature, iMac G5 Hard Drive, 20-inch Replacement Instructions, 2005, 14 p.
Apple Computer, Inc. Product Literature, Power Mac G5 Memory Replacement Instructions, 2004, 7 p.
Apple Computer, Inc. Product Literature, iMac G5 Upper Fan, Education Unit Replacement Instructions, 2005, 11 p.
Apple Inc. Product Literature, iPod touch User Guide, 2013 137 p.
Apple Inc. Product Literature, Mac Pro Front Panel Board Cable Replacement Instructions, 2009, 14 p.
Apple Inc. Product Literature, Component Creation Reference for QuickTime, 2006, 163 p.
Apple Inc. Product Literature, MacBook Pro Quick Start Guide, 2012, 2 p.
Apple Inc. Product Literature, NSSoundDelegate Protocol Reference, 2009, 6 p.
Apple Inc. Product Literature, QuickTime Movie Internals Guide, 2005, 62 p.
Apple Inc. Product Literature, IMVideoDataSource Protocol Reference, 2010, 9 p.
Apple Inc. Product Literature, iPod touch User Guide, 2011, 230 p. 43.
Apple Computer, Inc. Product Literature, iMac G5, 17-inch (Ambient Light Sensor) Lower Fan, iMac G5, 17-inch Replacement Instructions, 2005, 13 p.
Apple Inc. Product Literature, CVPixelFormatDescription Reference, 2012, 19 p.
Apple Inc. Product Literature, AV Foundation QuickTime Constants, 2011, 16 p.
Apple Computer, Inc. Product Literature, iPod nano Lanyard Headphones, 2006, 8 p.
Apple Inc. Product Literature, iPhone User Guide, 2012, 179 p.
Apple Inc. Product Literature, Mac mini, 2009, 72 p.
Apple Computer, Inc. Product Literature, Mac Pro Hard Drive Replacement Instructions, 2006, 5 p.
Thomas G. Stockham, Jr., "High-Speed Convolution and Correlation," Proceedings of the AFIPS '66 (Spring) Joint Computer Conference, Apr. 26-28, 1966, pp. 229-233.
Barry Arons, "Techniques, Perception, and Applications of Time-Compressed Speech," Proceedings of 1992 Conference, American Voice I/O Society, Sep. 1992, pp. 169-177.
Javan™ Media Framework API Guide, Nov. 19, 1999, JMF 2.0 FCS, 1998-99 Sun Microsystems, Inc., 265p.
James L. Wayman et al., "High Quality Speech Expansion, Compression, and Noise Filtering Using the Sola Method of Time Scale Modification," 23rd Asilomar Conference on Signals, Systems, and Computers, Oct. 30-Nov. 1, 1989, vol. 2, pp. 714-717.
Lawrence R. Rabiner et al., "A Comparative Performance Study of Several Pitch Detection Algorithms," IEEE Transactions on Acoustics, Speech, and Signal Processing, vol. ASSP-24, No. 5, Oct. 1976, pp. 399-418.
Ryoji Suzuki et al., "Time-Scale Modification of Speed Signals Using Cross-Correlation Functions," IEEE Transactions on Consumer Electronics, vol. 38, No. 3, Aug. 1992, 357-363.
Jasiuk et al., "Improved Speech Modification Method," ICASSP—International Conference on Acoustics, Speech, and Signal Processing, Apr. 6-9, 1987, pp. 1465-1468.
John Makhoul et al., "Time-Scale Modification in Medium to Low Rate Speech Coding," IEEE ICASSP 86, Tokyo, Apr. 1986, pp. 1705-1708.
Philipp Ackermann, "Direct Manipulation of Temporal Structures in a Multimedia Application Framework," Multimedia '94 Proceedings of the second ACM international conference on Multimedia, Oct. 15-20, 1994, pp. 51-58.
Mohamad K. Asi et al., "A Linear Filter for Time Scaling of Speech," ICASSP-88., International Conference on Acoustics, Speech, and Signal Processing, Apr. 11-14, 1988, vol. 1, pp. 79-82.
Francis C. Li et al., "Browsing Digital Video," Proceedings of the SIGCHI conference on Human Factors in Computing Systems, Apr. 2000, pp. 169-176.
Curtis Roads, "Introduction to Granular Synthesis," Computer Music Journal, vol. 12, No. 2 (Summer, 1988), pp. 11-13.
Salim Roucos et al., "High Quality Time-Scale Modification for Speech," ICASSP '85 IEEE International Conference on Acoustics, Speech, and Signal Processing, Apr. 26-29, 1985, pp. 493-496.
F.J. Charpentier et al., "Diphone Synthesis Using an Overlap-Add Technique for Speech Waveforms Concatenation," ICASSP 86 IEEE International Conference on Acoustics Speech and Signal Processing, Apr. 1986, vol. 11, pp. 2015-2018.
Andreas Girgensohn, et al., "Facilitating Video Access by Visualizing Automatic Analysis," Proceedings of Interact 99—IFIP TC13 Seventh International Conference on Human-Computer Interaction, Aug. 30-Sep. 3, 1999, 8 p.
Inside Macintosh; QuickTime Components; Addison-Wesley Publishing Company, 1999, Apple Computer, Inc., 728p.
Salim Roucos et al., "The Waveform Segment Vocoder: A New Approach for Very-Low-Rate Speech Coding," ICASSP '85 IEEE

(56) References Cited

OTHER PUBLICATIONS

International Conference on Acoustics, Speech, and Signal Processing, Apr. 26-29, 1985, pp. 236-239.
Eric Moulines, et al., "High-Quality Prosodic Modifications of Speech Using Time-Domain Overlap-Add Synthesis," Douzieme Colloque GRE1SI—Juan-Les-Pins 12 AU, Jun. 16, 1989, pp. 541-544.
Eric Moulines et al., "Non-parametric techniques for pitch-scale and time-scale modification of speech," Speech Communication, vol. 16, Issue 2, Feb. 1995, pp. 175-205.
Douglas L. Jones et al., "Generation and Combination of Grains for Music Synthesis," Computer Music Journal, vol. 12, No. 2 (Summer, 1988), pp. 27-34.
T.D.C. Little, "Time-Based Media Representation and Delivery," in Multimedia Systems, J.F. Koegel, Ed., ACM Press, Mar. 1994, pp. 175-200.
Grant Fairbanks, et al., "Method for Time or Frequency Compression-Expansion of Speech," Transactions of the IRE Professional Group on Audio, vol. 2, Issue 1, Jan. 1954, pp. 7-12.
Lawrence R. Rabiner, "On the Use of Autocorrelation Analysis for Pitch Detection," IEEE Transactions on Acoustics, Speech, and Signal Processing, vol. ASSP-25, No. 1, Feb. 1977, pp. 24-33.
Francis Charpentier et al., "Text-To-Speech Algorithms Based on FFT Synthesis," Proceedings of the IEEE International Conference on Acoustics, Speech, and Signal Processing, 1988, pp. 667-670.
Ming-Syan Chen, et al., "Support for Fully Interactive Playout in a Disk-Array-Based Video Server," Multimedia '94 Proceedings of the second ACM international conference on Multimedia, Oct. 15-20, 1994, pp. 391-398.
David P. Morgan, et al., "A Keyword Spotter Which Incorporates Neural Networks for Secondary Processing," ICASSP-90., 1990 International Conference on Acoustics, Speech, and Signal Processing, Apr. 3-6, 1990, vol. 1, pp. 113-116.
Kazutoshi Fujikawa, et al., "Multimedia Presentation System 'Harmony' with Temporal and Active Media," Proceedings of the Summer 1991 USENIX Conference, Jun. 1991, pp. 75-94.
Salim Roucos, et al., "A Segment Vocoder Algorithm for Real-Time Implementation," ICASSP '87 IEEE International Conference on Acoustics, Speech, and Signal Processing, Apr. 1987, vol. 12, pp. 1949-1952.
Jean Laroche, "AutocorrelationMethod for High-Quality Time/Pitch-Scaling.," IEEE Workshop on Applications of Signal Processing to Audio and Acoustics, Oct. 17-20, 1993, pp. 131-134.
Apple Inc. Product Literature, Mac Pro ATI Radeon Graphics Card Replacement Instructions, 2009, 10 p.
Apple Inc. Product Literature, QTCaptureView Class Reference, 2009, 12 p.
Apple Computer, Inc. Product Literature, Power Mac G5 AGP/PCI Card Replacement Instructions, 2003, 7 p.
Apple Inc. Product Literature, Audio Format Services Reference, 2011, 21 p.
Apple Inc. Product Literature, iPhone User Guide, 2013, 156 p.
Apple Inc. Product Literature, iPad User Guide, 2010, 154 p.
Apple Computer, Inc. Product Literature, MacBook User's Guide, 2006, 138 p.
Apple Inc. Product Literature, QTCaptureDevice Class Reference, 2010, 28 p.
Apple Inc. Product Literature, Audio Queue Services Reference, 2011, 54 p.
Apple Inc. Product Literature, Audio Unit Parameters Reference, 2009, 8 p.
Apple Computer, Inc. Product Literature, iPod Hi-Fi User's Guide, 2006, 104 p.
Apple Computer, Inc. Product Literature, CVOpenGLBufferPool Reference, 2010, 10 p.
Apple Inc. Product Literature, iPod classic User Guide, 2008, 76 p.
Apple Inc. Product Literature, QTMovieLayer Class Reference, 2009, 7 p.
Apple Inc. Product Literature, Mac Pro Speaker Replacement Instructions, 2009, 16 p.
Apple Inc. Product Literature, MacBook, 2006, 76 p.
Apple Inc. Product Literature, Say hello to your MacBook Pro, 2010, 88 p.
Apple Inc. Product Literature, Say hello to your MacBook Pro, 2008, 88 p.
Apple Inc. Product Literature, In-Ear Headphones with Remote and Mic, 2010, 48 p.
Apple Inc. Product Literature, Mac Pro Mac Pro RAID Card and Battery Replacement Instructions, 2009, 6 p.
"Time Scale Modification of Audio," Enounce, Inc., WayBackMachine Jun. 20, 2000, Available at: web.archive.org/web/20000620153425/http://www.enounce.com/, downloaded Feb. 1, 2013.
"The Best Products of 1998," PC Magazine, vol. 18, No. 1, Jan. 5, 1999, pp. 6, 7, 85.
T.D.C. Little et al., "Management of time-dependent multimedia data," SPIE Proceedings: Enabling Technologies for High-Bandwidth Applications, Jan. 20, 1993, vol. 1785, pp. 110-121.
Suzuki et al., "Time-Scale Modification of Speech Signals Using Cross-Correlation," IEEE Transactions on Consumer Electronics, Aug. 1992, vol. 38, Issue 3, pp. 357-363.
Allen, "Short Term Spectral Analysis, Modification by Discrete Fourier Transform Synthesis, and," IEEE Transactions on Acoustics, Speech, and Signal Processing, vol. ASSP-25, No. 3, Jun. 1977, pp. 235-238.
"Become a better player or singer the fast," WayBackMachine May 20, 2000, Available at: web.archive.org/web/20000520041439/http://www.slowgold.com/, downloaded May 6, 2013.
Lookabaugh et al., "Application of the Princen-Bradley Filter Bank to Speech and Image Compression," IEEE Transactions on Acolistics, Speech and Signal Processing, vol. 38. No. II. Nov. 1990, pp. 1914-1926.
Moulines et al., "Pitch-Synchronous Waveform Processing Techniques for Text-To-Speech Synthesis Using Diphones," Speech Communication, vol. 9, No. 5-6, pp. 453-467. Dec. 1990.
Charpentier et al., "Diphone Synthesis Using an Overlap-Add Technique for Speech Waveforms Concatenation," ICASSP 86 IEEE International Conference on Acoustics Speech and Signal Processing, vol. 11, pp. 2015-2018. Apr. 1986.
Hamon et al., "A Diphone Synthesis System Based on Time-Domain Prosodic Modifications of Speech," IEEE International Conference on Acoustics, Speech, and Signal Processing, May 23-26, 1989, vol. 1, pp. 238-241.
Portnoff, "Time-Scale Modification of Speech Based on Short-Time Fourier Analysis," Mass. Institute of Technology, Apr. 1978, 165 p.
"2xAV Plug-in for RealPlayer Installation Problems," Enounce, Inc., WayBackMachine Oct. 6, 2000, Available at: web.archive.org/web/20001006205732/http://www.enounce.com/products/real/2xav/installproblems.htm, downloaded Feb. 1, 2013.
Sylvestre, "Time-Scale Modification of Speech:A Time-Frequency Approach," McGill University, Montreal Apr. 1991, A Thesis submitted to the Faculty of Graduate Studies and Research in partial fulfillment of the requirements for the degree of Master of Engineering.
Dale E. Lichtblau, "A Multimedia-Based System for Foreign Language Listening and Reading Comprehension," Institute for Defense Analyses, Mar. 1999.
Tobiah E. Smith et al., "Towards an Automatic Synthesis System for Real-Time Software," in Proc. of Real-Time Systems Symposium, pp. 34-42. Dec. 4-6, 1991.
"Slow Speed CD Transcriber," WayBackMachine Nov. 21, 1999, Available at: web.archive.org/web/19991121235537/http://ronimusic.com/slspcdtr.htm, 4 p., downloaded Feb. 1, 2013.
Christian Hamon, et al., "A Diphone Synthesis System Based on Time-Domain Prosodic Modifications of Speech," IEEE International Conference on Acoustics, Speech, and Signal Processing, May 23-26, 1989, vol. 1, pp. 238-241.
Barry Truax, "Discovering Inner Complexity: Time Shifting and Transposition with a Real-Time Granulation Technique," Computer Music Journal, Summer 1994, vol. 18, No. 2, pp. 38-48.
Myron J. Ross, et al., "Average Magnitude Difference Function Pitch Extractor," IEEE Transactions on Acoustics, Speech, and Signal Processing, vol. ASSP-22, No. 5, Oct. 1974, pp. 353-362.

(56) References Cited

OTHER PUBLICATIONS

Information technology—Generic coding of moving pictures and associated audio information: Systems, International Standard, Second edition Dec. 1, 2000, 174 p.

John Makhoul et al., "Time-Scale Modification in Medium to Low Rate Speech Coding," IEEE, ICASSP 86, Tokyo, pp. 1705-1708. Apr. 1986.

Jont B. Allen et al., "A Unified Approach to Short-Time Fourier Analysis and Synthesis," Proceedings of the IEEE, vol. 65, No. 11, Nov. 1977, pp. 1558-1564.

Max Mohan Sondhi, "New Methods of Pitch Extraction," IEEE Transactions on Audio and Electroacoustics vol. AU-16, No. 2 Jun. 1968, pp. 262-266.

Newsgroups: alt guitar.tab: Newsgroup message: From: "Ian Spencer" <JustForNewsgro...@tesco.net>; Subject: Re: best way to slow down a song?; Date: Apr. 4, 2000; https://groups.google.com/group/alt.guitar.tab/msg/81c79674cd86f662?dmode=source&output=gplain&noredirect.

R. E. Crochiere, "A Weighted Overlap-Add Method of Short-Time Fourier Analysis/Synthesis," IEEE Transactions on Acoustics, Speech, and Signal Processing, vol. ASSP-28, No. 1, Feb. 1980, pp. 99-102.

Robert J. Scott and Sanford E. Gerber, "Pitch-Synchronous Time-Compression of Speech," Proceedings of Conference for Speech Communications Processing, pp. 63-65, Apr. 1972.

Daniel W. Griffin and Jae S. Lim, "Signal Estimation from Modified Short-Term Fourier Transform," IEEE Transactions on Acoustics, Speech, and Signal Processing., vol. ASSP-32, No. 2, Apr. 1984, pp. 236-243.

Werner Verhelst and Marc Roelands, "An Overlap-Add Technique Based on Waveform Similarity (WSOLA) for High Quality Time-Scale Modification of Speech," ICASSP-93 IEEE International Conference on Acoustics, Speech, and Signal Processing, Apr. 27-30, 1993, vol. 2, pp. 554-557.

Narumi Hirose, Information technology—Coding of audio-visual objects, ISO/IEC JTC 1/Sc 29/WG 11, Oct. 3, 1999, 144 p.

D. Malah, "Time Domain Algorithms for Time Scale Variation of Speech Signals," Faculty of Electrical Engineering, Technion Israel Institute of Technology, Haifa, Israel, May 1976, 33 p.

F. Hlawatsch and G.F. Boudreaux-Bartels, "Linear and Quadratic Time-Frequency Signal Representations," IEEE SP Magazine, Apr. 1992, pp. 21-67.

Christian Hamon, Eric Moulines, Francis Charpentier, "A Diphone Synthesis System Based on Time-Domain Prosodic Modifications of Speech," Centre National d'Etudes de Telecommunications, International Conference on Acoustics, Speech, and Signal Processing, vol. 1, pp. 238-241, May 23-26, 1989.

Robert Bristow-Johnson, "A Detailed Analysis of a Time-Domain Formant Corrected Pitch Shifting Algorithm," 95th Convention of the AES, Oct. 7-10, 1993, 24 p.

Thomas Vinod Johnson, Aidong Zhang, "Dynamic Playout Scheduling Algorithms for Continuous Multimedia Streams," Springer-Verlag, Multimedia Systems, vol. 7, Issue 4, Jul. 1999, pp. 312-325.

Werner Verhelst, "Overlap-Add Methods for Time-Scaling of Speech," Vrije Universiteit Brussel, Faculty of Applied Science, Jul. 16, 1998.

David Malar, "Time-Domain Algorithms for Harmonic Bandwidth Reduction and Time Scaling of Speech Signals," IEEE Transactions on Acoustics, Speech, and Signal Processing, vol. ASSP-27, No. 2, Apr. 1979, pp. 121-133.

John Kuzmich, "Innovative Transcribing Software Application: Transkriber!," Jazz Educators Journal for the International Association of Jazz Educations, pp. 65-68, Jul. 1998.

Salim Roucos and Alexander M. Wilgus, "High Quality Time-Scale Modification for Speech," ICASSP '85 IEEE International Conference on Acoustics, Speech, and Signal Processing, Apr. 26-29, 1985, pp. 493-496.

John David N. Dionisio and Alfonso F. Cardenas, "A Unified Data Model for Representing Multimedia, Timeline, and Simulation Data," IEEE Transactions on Knowledge and Data Engineering, vol. 10, No. 5, Sep./Oct. 1998, pp. 746-767.

A. Amir, D. Ponceleon, B. Blanchard, D. Petkovic, S. Srinivasan, "Using Audio Time Scale Modification for Video Browsing," HICSS '00 Proceedings of the 33rd Hawaii International Conference on System Sciences, Jan. 4-7, 2000, vol. 3, p. 3046.

Jon Dattorro, Using Digital Signal Processor Chips in a Stereo Audio Time Compressor/Expander, 83rd Convention of the AES, Oct. 16-19, 1987, 9 p.

Keith Lent, "An Efficient Method for Pitch Shifting Digitally Sampled Sounds," Computer Music Journal, vol. 13, No. 4, pp. 65-71, Winter 1989.

"2xAV Plug-in for RealPlayer," Enounce, Inc., WayBackMachine, Aug. 17, 2000, available online at web.archive.org/web/20000817045214/http://www.enounce.com/products/real/2xav/index.htm, downloaded Feb. 1, 2013.

Toshio Irino and Hideki Kawahara, "Signal Reconstruction from Modified Wavelet Transform," IEEE International Conference on Acoustics, Speech, and Signal Processing, pp. 85-88, Mar. 23-26, 1992.

Creative "Nomad Jukebox" User Guide, Feb. 2001, 53 p.

Francisco J. Casajus-Quiros and Ramon Garcia-Gomez, "Dynamic Time-Scale Compression for Waveform Speech Coding," ICASSP '86 IEEE International Conference on Acoustics, Speech, and Signal Processing, Apr. 1986, vol. 11, pp. 2399-2401.

Sonic Foundry Digital Media Solutions, WayBackMachine, Jan. 16, 2000, available online at web.archive.org/web/20000116143828/http://www.sonicfoundry.com/PRODUCTS/ShowProductasp-?PID=7, downloaded May 13, 2013.

"Older Versions of the PaceMaker Plug-In," May 21, 2000, Available at: www.surina.net/pacemaker/old/index.html, downloaded May 7, 2013.

Nosa Omoigui, Liwei He, Anoop Gupta, Jonathan Grudin, and Elizabeth Sanocki, "Time-Compression: Systems Concerns, Usage, and Benefits," Proceedings of the ACM CHI 99 Human Factors in Computing Systems Conference, May 15-20, 1999, pp. 136-143.

Sonic Foundry Digital Media Solutions, WayBackMachine, Jan. 26, 2000, available online at web.archive.org/web/20000126040047/http://sonicfoundry.com/PRODUCTS/ShowProduct.asp?PID=7&FeatureID=313, downloaded May 13, 2013.

"Information Technology-Generic coding of moving pictures and associated audio information," International Standard ISO/IEC 13818-3, Second Edition, Apr. 15, 1998, 126 p.

"RealNetworks' RealPlayer Surpasses 115 Million Unique Registered Users," Press Release Apr. 10, 2000, WayBackMachine Nov. 18, 2001, available online at web.archive.org/web/20011118160612/http://www.realnetworks.com/company/press/releases/2000/player115.html, downloaded May 14, 2013.

"Slow Me Down—DSP plugin for Winamp," WayBackMachine Feb. 11, 2001, available online at web.archive.org/web/20010211002007/http://www.ronimusic.com/winamp.htm, downloaded May 12, 2013.

Apple Inc. Product Literature, MusicEventIterator Reference, 2009, 19 p.

Apple Inc. Product Literature, Mac Pro PCIe/Graphics Card Replacement Instructions, 2009, 6 p.

Apple Inc. Product Literature, Mac Pro Optical Drive Replacement Instructions, 2009, 5 p.

Apple Inc. Product Literature, iPhone Bluetooth Headset User Guide, 2008, 60 p.

Apple Inc. Product Literature, QTCaptureDeviceInput Class Reference, 2009, 7 p.

Apple Inc. Product Literature, Welcome to your Mac mini, 2011, 84 p.

Apple Inc. Product Literature, QTKit Functions Reference, 2010, 18 p.

Apple Inc. Product Literature, MacBook Pro (13-inch Mid 2009) Hard Drive Replacement Instructions, 2009, 7 p.

Apple Computer, Inc. Product Literature, Power Mac G5 Air Deflector Replacement Instructions, 2003, 4 p.

Apple Inc. Product Literature, Welcome to your new MacBook Pro, 2012, 2 p.

(56) References Cited

OTHER PUBLICATIONS

Apple Inc. Product Literature, AVMutableCompositionTrack Class Reference, 2010, 12 p.
Apple Inc. Product Literature, AV Foundation Error Constants, 2011, 11 p.
Apple Inc. Product Literature, iPod touch User Guide, 2009, 169 p.
Apple Computer, Inc. Product Literature, iPod touch Features Guide, 2008, 98 p.
Apple Computer, Inc. Product Literature, Mac mini User's Guide, 2005, 112 p.
Apple Inc. Product Literature, iPhone 3G Dock, 2008, 28 p.
Apple Inc. Product Literature, Audio Unit Component Services Reference, 2011, 49 p.
Apple Computer, Inc. Product Literature, Power Mac G5 User's Guide, 2005, 120 p.
Apple Inc. Product Literature, Core Video Programming Guide, 2004, 27 p.
Apple Inc. Product Literature, HTML Scripting Guide for QuickTime, 2005, 55 p.
Apple Computer, Inc. Product Literature, Compression and Decompression Reference for QuickTime, 2006, 228 p.
Apple Inc. Product Literature, iPod touch Important Product Information Guide, 2010, 16 p.
Apple Inc. Product Literature, MacBook Pro, 2008, 82 p.
Apple Inc. Product Literature, iPod shuffle User Guide, 2012, 32 p.
Apple Computer, Inc. Product Literature, Power Mac G5 Hard Drive Guide Screws Replacement Instructions, 2003, 8 p.
Apple Inc. Product Literature, QTMovieView Class Reference, 2010, 30 p.
Apple Inc. Product Literature, iPhone 3G S Important Product Information Guide, 2011, 32 p.
Apple Inc. Product Literature, QuickTime Media Types and Media Handlers Guide, 2005, 93 p.
Apple Inc. Product Literature, AVAssetReader Class Reference, 2010, 14 p.
Apple Computer, Inc. Product Literature, Power Mac G5 Modem Replacement Instructions, 2004, 6 p.
Apple Computer, Inc. Product Literature, Mac Pro Optical Drive Replacement Instructions, 2006, 7 p.
Apple Computer, Inc. Product Literature, QTCaptureDecompressedAudioOutput Class Reference, 2009, 8 p.
Apple Inc. Product Literature, CMBufferQueue Reference, 2003, 33 p.
Apple Inc. Product Literature, Import and Export Reference for QuickTime, 2006, 156 p.
Apple Inc. Product Literature, Mac Pro PCI Express/Graphics Card Replacement Instructions, 2006, 5 p.
Apple Inc. Product Literature, iPod nano Armband, 2009, 8 p.
Apple Inc. Product Literature, Core Video Constants Reference, 2012, 6 p.
Apple Inc. Product Literature, iPod shuffle Features Guide, 2007, 35 p.
Apple Computer, Inc. Product Literature, iMac G5 Memory, 17-inch Replacement Instructions, 2004, 11 p.
Apple Inc. Product Literature, MacBook (13-inch) 073-1045 Rev. B Hard Drive Replacement Instructions, 2007, 9 p.
Apple Inc. Product Literature, QTSampleBuffer Class Reference, 2009, 15 p.
Apple Computer, Inc. Product Literature, Windows API Reference for QuickTime, 2006, 10 p.
Apple Inc. Product Literature, Apple USB Power Adapter, 2009, 8 p.
Apple Inc. Product Literature, AVComposition Class Reference, 2010, 6 p.
Apple Computer, Inc. Product Literature, iMac G5 Optical Drive, 20-inch Replacement Instructions, 2005, 12 p.
Apple Inc. Product Literature, QTMedia Class Reference, 2009, 18 p.
Apple Inc. Product Literature, MacBook Air Important Product Information Guide, 2012, 16 p.
Apple Computer, Inc. Product Literature, iPod nano Dock, 2006, 20 p.
Apple Inc. Product Literature, Audio Unit Programming Guide, 2007, 153 p.
Apple Computer, Inc. Product Literature, iMac G5 Power Supply, 17-inch Replacement Instructions, 2005, 18 p.
Apple Inc. Product Literature, NSCoder QTKit Additions Reference, 2007, 8 p.
Apple Inc. Product Literature, Audio Component Services Reference, 2011, 13 p.
Apple Inc. Product Literature, Mac mini, 2007, 72 p.
Apple Inc. Product Literature, CVPixelBuffer Reference, 2010, 29 p.
Apple Inc. Product Literature, QuickTime Movie Properties Reference, 2006, 71 p.
Apple Computer, Inc. Product Literature, Power Mac G5 User's Guide, 2005, 112 p.
Apple Computer, Inc. Product Literature, iMac G5 Back Cover and Stand Replacement Instructions, 2005, 8 p.
Apple Computer, Inc. Product Literature, Mac Pro Memory (FB-DIMM) Replacement Instructions, 2006, 7 p.
Apple Inc. Product Literature, QTKit Application Programming Guide, 2009, 77 p.
Apple Inc. Product Literature, IMAVManager Class Reference, 2009, 17 p.
Apple Computer, Inc. Product Literature, MacBook (13-inch) Battery Replacement Instructions, 2006, 4 p.
Apple Inc. Product Literature, AVCaptureSession Class Reference, 2011, 22 p.
Apple Computer, Inc. Product Literature, PowerBook G4 17-inch User's Guide, 2005 112 p.
Apple Inc. Product Literature, DVD Playback Services Programming Guide, 2005, 38 p.
Apple Inc. Product Literature, Mac Pro Processor Cage Fans, Front and Rear Replacement Instructions, 2009, 15 p.
Apple Computer, Inc. Product Literature, Mac Pro Hard Drive Carrier Replacement Instructions, 2006, 5 p.
Apple Inc. Product Literature, iPhone Quick Start guide, 2010, 2p.
Apple Inc. Product Literature, iPod classic Features Guide, 2008, 72 p.
Apple Inc. Product Literature, Core Audio Overview, 2008, 93 p.
Apple Inc. Product Literature, Mac mini User's Guide, 2006, 96 p.
Apple Computer, Inc. Product Literature, iMac G5 Optical Drive, 17-inch Replacement Instructions, 2005, 13 p.
Apple Computer, Inc. Product Literature, Power Mac G5 Hard Drive Replacement Instructions, 2003, 9 p.
Apple Computer, Inc. Product Literature, PowerBook G4 12-inch User's Guide, 2005, 112 p.
Apple Inc. Product Literature, DVD Playback Framework Reference, 2005, 129 p.
Apple Inc. Product Literature, AVCaptureDeviceFormat Class Reference, 2012, 7 p.
Apple Inc. Product Literature, QuickTime Movie Track and Media Reference, 2006, 184 p.
Apple Computer, Inc. Product Literature, MacBook (13-inch, Late 2009)/(13-inch, Mid 2010) Hard Drive Replacement Instructions, 2010, 10 p.
Apple Computer, Inc. Product Literature, iMac G5 Inverter, 17-inch Replacement Instructions, 2005, 19 p.
Apple Inc. Product Literature, iPod nano Features Guide, 2006, 60 p.
Apple Inc. Product Literature, Say hello to your MacBook, 2008, 88 p.

\* cited by examiner

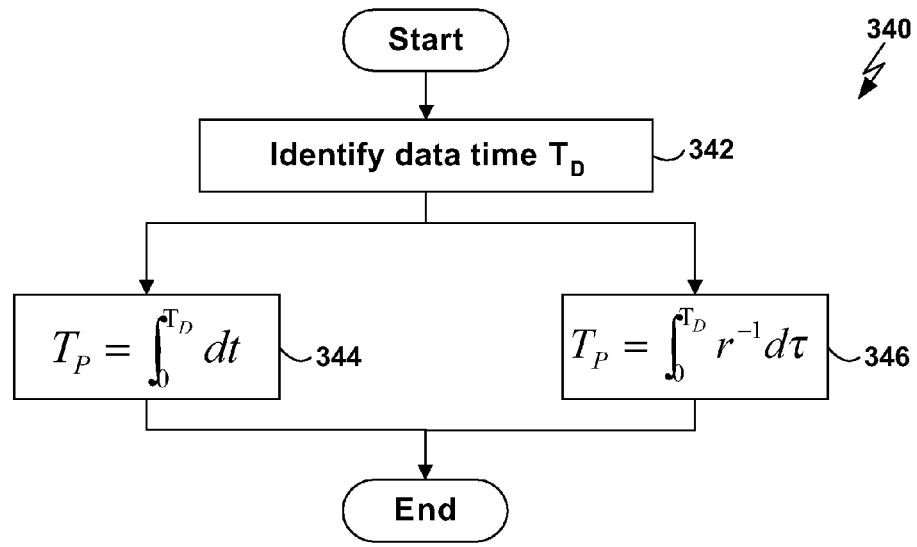

ASSOCIATING BUFFERS WITH TEMPORAL SEQUENCE PRESENTATION DATA

CROSS REFERENCE TO RELATED APPLICATIONS

This application is a divisional of U.S. patent application Ser. No. 13/303,540, filed on Nov. 23, 2011, entitled, "Identifying a Presentation Time Based on Rendition Periods and Presentation Rates," which is hereby incorporated by reference; which is a divisional of U.S. patent application Ser. No. 12/716,273, filed on Mar. 3, 2010, entitled, "Management of Presentation Time in a Digital Media Presentation System with Variable Rate Presentation Capability," which is hereby incorporated by reference; which is a continuation of U.S. patent application Ser. No. 10/919,963, filed on Aug. 16, 2004, entitled, "Management of Presentation Time in a Digital Media Presentation System with Variable Rate Presentation Capability," which is hereby incorporated by reference; which is a continuation-in-part of U.S. patent application Ser. No. 10/014,894, filed on Dec. 11, 2001, entitled "Management of Presentation Time in a Digital Media Presentation System with Variable Rate Presentation Capability," which is hereby incorporated by reference; which claims the benefit of U.S. Provisional Patent Application Ser. No. 60/255,226, filed on Dec. 12, 2000, which is hereby incorporated by reference.

BACKGROUND

1. Field of the Invention

The present invention relates to the field of content presentation by a digital rendering system such as a digital media player.

2. Related Art

Most traditional digital rendering systems, such as RealNetworks® RealPlayer® digital media players, maintain an internal variable during playback of media content that reflects a current presentation time (hereafter referred to as "Current Time"). Current Time is, in effect, a current "position" in the media content that is being displayed and rendered. Typically Current Time is set to zero at the beginning of the media content, and it reaches a measure of time equal to a duration of presentation of the content of the entire work when the end of the media content is reached.

In most traditional players, such as the RealPlayer® digital media player, a Current Time value is: (a) regularly calculated by a single module; (b) acquired and stored by core routines of the player; and (c) distributed to, and utilized by, various internal player objects. These internal objects utilize the Current Time value to determine when it is time to initiate or terminate various tasks associated with media content playback. The calculation of a Current Time value by the single module, and the distribution to, and utilization by, multiple objects within a player of the same Current Time value has a desirable result of keeping all objects synchronized.

Typically the Current Time value must be regularly and accurately updated by the player, or the presentation of media content will be faulty. For instance, if the Current Time value is not updated sufficiently often, a video component of a media stream may appear uneven or jumpy, and gaps in an audio content may be audible.

Although the concept of Current Time seems straightforward, in fact, it conflates two subtly different properties of media playback. The first property of media playback that is conflated in the concept of Current Time is a time elapsed since the beginning of the media content presentation (hereafter called "Presentation Time"). Thus, if the media has been playing for one minute, the value of Presentation Time is 60,000 milliseconds. All of time values discussed herein can be measured in various units. Two popular units are milliseconds, and centi-nanoseconds, or 1/10,000,000 of a second. The unit of measurement is not an issue here. Other considerations of representing time that are not issues here are the precision, the range of values, and the format of the representation.

The second property of media playback that is conflated in the concept of Current Time is a location in the media content stream that is currently being played (hereafter called "Content Time"). In a traditional linear media stream that is always played back at a fixed, "normal" rate, any given content element is always presented after a fixed amount of time has elapsed from the beginning of playback. Because of this, each such content element can be regarded as having a timestamp associated with it, i.e., a time value specifying how long it would take to reach that location, starting from the beginning of the media content, and playing at normal rate. Hereinafter we will call this property "Data Time."

Presentation Time and Data Time are identical in traditional players, because traditional players can only present media content at a fixed "normal" rate. However, when a player is enhanced with a Time-Scale Modification (TSM) capability, it can present media content at various rates. Because of this, Presentation Time and Data Time are no longer the same. For example, if a 60-second clip of media content is presented at a fixed rate that is twice normal rate, at the end of the clip the Data Time is 60,000 milliseconds, but the Presentation Time is 30,000 milliseconds. This is because it only takes 30 seconds to play the 60-second clip.

We have discovered that problems may occur when a traditional player is enhanced with TSM functionality. In particular, if a Current Time value is distributed to multiple objects, some of them may interpret the Current Time value as specifying Data Time, some of them may interpret the Current Time value as specifying Presentation Time, and some of them may interpret the Current Time value as specifying both Data and Presentation Time. Thus, a first problem occurring when a traditional player is enhanced with TSM functionality is that the significance of the time value distributed to multiple objects is, in general, ambiguous. A second problem occurring when a traditional player is enhanced with TSM functionality is that Data Time does not, in general, equal Presentation Time, and the calculation, storage, and distribution of a single time value is inadequate to specify both values.

It is quite common for media players to rely on an audio renderer (for example, a player object responsible for outputting audio content through, for example, a computer sound card) to calculate and update the Current Time value. This is done because the nature of audio representation is such that typically each audio data element has either a fixed, or explicitly specified presentation duration, associated with it, and these presentation durations are enforced by audio rendering hardware. Therefore, the audio renderer can typically determine Presentation Time either by maintaining a running total of the presentation durations of all audio data elements rendered since playback began, or in some cases by querying the audio rendering hardware itself for the equivalent value.

If a media player does in fact acquire the Current Time value from the audio renderer, the value that the audio renderer will return to the system will typically be the Presentation Time. Since most of the rest of the system needs Data Time, most of the rest of the system can no longer employ the value returned by the audio renderer object.

As one can readily appreciate from the above, a need exists in the art for a method and apparatus for solving one or more of the above-described problems.

SUMMARY

Techniques are provided for managing Presentation Time in a digital rendering system for presentation of temporally-ordered data when the digital rendering system includes a Variable Rate Presentation capability. In one embodiment, Presentation Time is converted to Data Time, and Data Time is reported instead of Presentation Time when only one time can be reported. In another embodiment, a predetermined one of Presentation Time and Data Time is returned in response to a request for a Current Time.

In one embodiment of the present invention, a method is provided for rendering temporal sequence presentation data in a rendering system. The method includes steps of: (A) receiving a request from a first component of the rendering system for a first current time; (B) identifying a value of a presentation time parameter representing an amount of time elapsed during rendering of a portion of the temporal sequence presentation data; (C) providing the value of the presentation time parameter to the first component in response to the request; (D) receiving a request from a second component of the rendering system for a second current time; (E) identifying a value of a data time parameter representing an amount of time required to render the portion of the temporal sequence presentation data at a default presentation rate; and (F) providing the value of the data time parameter to the second component in response to the request; (G) wherein the presentation time parameter value and the data time parameter value represent different times.

In another embodiment of the present invention, a method is provided for use in a rendering system for rendering temporal sequence presentation data. The method comprising steps of: (A) initializing a presentation time parameter value to zero, the presentation time parameter representing an amount of time elapsed during rendering of a portion of the temporal sequence presentation data; (B) for each element in the portion of the temporal sequence presentation data, performing steps of: (1) identifying a default rendition period of the element; (2) identifying an actual presentation rate of the element; (3) dividing the default rendition period of the element by the actual presentation rate of the element; (4) adding the quotient of step (3) to the presentation time parameter value; and (C) identifying the sum produced by steps (A) and (B) as the presentation time parameter value.

In another embodiment of the present invention, a method is provided for use in a rendering system for rendering temporal sequence presentation data. The method includes steps of: (A) receiving an explicit request for a value of a presentation time parameter representing an amount of time elapsed during rendering of a portion of the temporal sequence presentation data, wherein the amount of time differs from an amount of time required to render the portion of the temporal sequence presentation data at a default presentation rate; and (B) providing the value of the presentation time parameter in response to the request.

In another embodiment of the present invention, a method is provided for use in a rendering system for rendering temporal sequence presentation data. The method includes steps of: (A) receiving an explicit request for the value of a data time parameter representing an amount of time required to render a portion of the temporal sequence presentation data at a default presentation rate, wherein the amount of time differs from an amount of time elapsed during rendering of the portion of the temporal sequence presentation data; and (B) providing the value of the data time parameter in response to the request.

In another embodiment of the present invention, a method is provided for enhancing a rendering system which renders temporal sequence presentation data, the rendering system not including distinct current presentation time and current data time parameters. The method includes steps of: (A) adding to the rendering system a monitoring module for monitoring values of a current presentation rate parameter that may vary over time, the current presentation rate parameter representing a current rate at which the portion of the temporal sequence presentation data is being rendered; (B) adding to the rendering system a data time module to identify, based on the values of the current presentation rate parameter, a current data time parameter value representing an amount of time required to render the portion of the temporal sequence presentation data at a default presentation rate; (C) adding to the rendering system a presentation rate modification module to render a portion of the temporal sequence presentation data at any of a plurality of presentation rates; and (D) adding to the rendering system a current time module for returning the value of a predetermined one of the presentation time parameter and the data time parameter in response to a request for a current time; wherein the presentation time parameter has a value that differs from the data time parameter value.

In another embodiment of the present invention, a method is provided for enhancing a rendering system which renders temporal sequence presentation data, the rendering system not including distinct current presentation time and current data time parameters. The method includes steps of: (A) adding to the rendering system a monitoring module for monitoring values of a current presentation rate parameter that may vary over time, the current presentation rate parameter representing a current rate at which the portion of the temporal sequence presentation data is being rendered; (B) adding to the rendering system a presentation time module to identify, based on the values of the current presentation rate parameter, a current presentation time parameter value representing an amount of time required to render the portion of the temporal sequence presentation data at the current rate; (C) adding to the rendering system a presentation rate modification module to render a portion of the temporal sequence presentation data at any of a plurality of presentation rates; and (D) adding to the rendering system a current time module for returning the value of a predetermined one of the presentation time parameter and the data time parameter in response to a request for a current time; wherein the presentation time parameter has a value that differs from the data time parameter value.

In another embodiment of the present invention, a method is provided for use in conjunction with a rendering system which renders temporal sequence presentation data. The method includes steps of: (A) receiving a request for a current time of the temporal sequence presentation data after a portion of the temporal sequence presentation data has been rendered by the rendering system; (B) in response to the request, performing steps of: (1) identifying a data time parameter value representing an amount of time required to render the portion of the temporal sequence presentation data at a default presentation rate; and (2) providing the data time parameter value in response to the request.

In another embodiment of the present invention, a method is provided for use in conjunction with a rendering system which renders temporal sequence presentation data. The method includes steps of: (A) receiving a request for a current time of the temporal sequence presentation data after a portion of the temporal sequence presentation data has been rendered by the rendering system; (B) determining, based on a property of the request, whether to return a value of a data time parameter or a value of a presentation time parameter; and (C) returning, in response to the request, the value determined in step (B).

In another embodiment of the present invention, a method is provided for use in conjunction with a rendering system which renders temporal sequence presentation data. The method includes steps of: (A) receiving a request for a current time of the temporal sequence presentation data after a portion of the temporal sequence presentation data has been rendered by the rendering system; (B) identifying an initial current time of the temporal sequence presentation data; (C) identifying at least one presentation rate associated with the temporal sequence presentation data; (D) modifying the initial current time based on the identified at least one presentation rate to produce a modified current time; and (E) providing the modified current time in response to the request.

In another embodiment of the present invention, a method is provided for use in conjunction with a rendering system which renders temporal sequence presentation data including a plurality of data samples. The method includes steps of: (A) grouping the plurality of data samples into a plurality of buffers; (B) associating with each of the plurality of buffers a corresponding presentation rate; (C) associating with each of the plurality of buffers a corresponding initial data time; (D) associating with each of the plurality of buffers a corresponding initial presentation time; (E) associating with each of the plurality of buffers a default rendition period; and (F) associating with each of the plurality of buffers an actual rendition period.

Other features and advantages of various aspects and embodiments of the present invention will become apparent from the following description and from the claims.

BRIEF DESCRIPTION OF THE DRAWINGS

FIG. 3D is a flowchart of a method for identifying a current Presentation Time based on a current Data Time according to one embodiment of the present invention;

FIG. 3E is a flowchart of a method for identifying a current Presentation Time based on a current element index according to one embodiment of the present invention;

DETAILED DESCRIPTION

Figure 1:
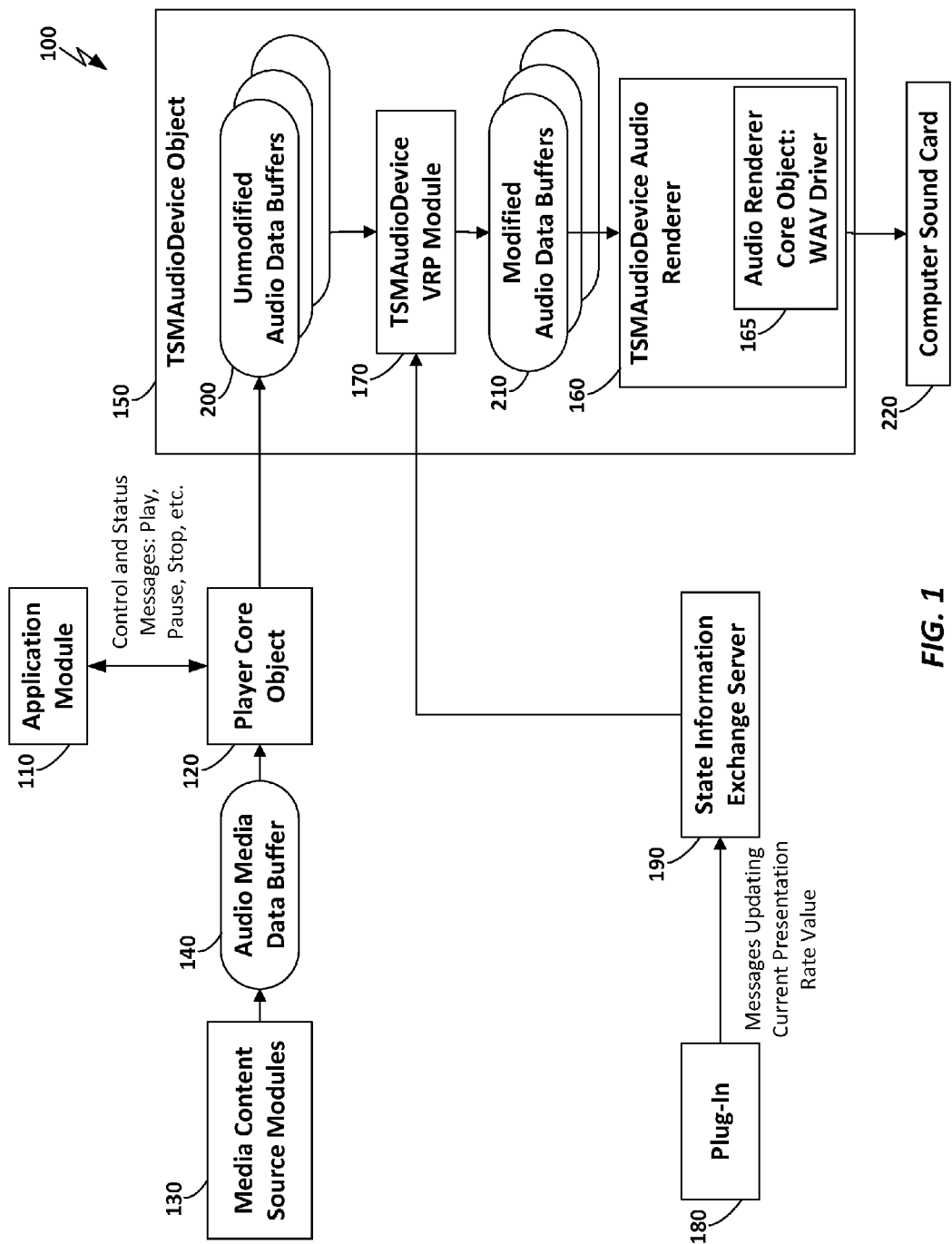
FIG. 1 shows a block diagram of a Presentation System embodied as a RealNetworks® RealPlayer® application running on a computer.

In accordance with one embodiment of the present invention, Presentation System 100 (a more general definition of a Presentation System is provided below) is embodied as a RealNetworks® RealPlayer® application running on a computer, for example, under some version of the Microsoft Windows operating system. As shown in FIG. 1, application module 110 sends to, and receives from, Player Core object 120, control and status messages such as, for example, Play, Pause, Stop, and so forth. Temporal Sequence Presentation Data, also referred to herein as Presentation Data, (a more general definition of Temporal Sequence Presentation Data is provided below) is embodied as streaming media content and is delivered to the RealPlayer® application over the Internet, a local-area network (LAN), or from files stored in the computer that is executing the RealPlayer® application. For example, in accordance with one embodiment, the Presentation Data, for example, audio data, is received by media content source module(s) 130, and are placed in audio media data buffers 140 that are made available to Player Core object 120.

As will be defined in more detail below, each data element of the Presentation Data has a Rendition Type that corresponds to a type of Renderer (a more general definition of Renderer is provided below) that can be used to render the data element. For example, for the embodiment described above, the Rendition Types that can be rendered include but are not limited to audio (encoded in various formats), video, still images, text, and scripts. In particular, audio is a Time-Distinguished Rendition Type (a more general definition of Time-Distinguished Rendition Type is provided below). As a result, for this embodiment, audio is organized within the RealPlayer® application in buffers that contain, for example, 100-milliseconds of sample values. Further, every buffer is timestamped, so these buffers are Timestamped Elements (as more generally described below, this means that the Data Time of the element is explicitly represented as part of the element), and the time associated with the first sample in every buffer is specified in milliseconds.

In accordance with this embodiment, the Rendition Period (as more generally described below, this is the length of time the rendering process should last for the element) of the audio buffers is 100 milliseconds. In some ways the individual audio samples play the part of the data elements as described below. It would be obvious to someone of ordinary skill in the art how to sometimes regard 100 millisecond buffers of samples and sometimes the individual samples themselves as audio elements. In accordance with this embodiment, a sample period of the individual audio samples is stored in a header that is part of the sample buffer definition (for example, one $10,000^{th}$ of a second is a typical sample period).

In accordance with this embodiment, an object called TSMAudioDevice object 150 combines functions of the Renderer for audio data (TSMAudioDevice Audio Renderer 160)

and a Variable Rate Presentation Module (a more general definition of Renderer is provided below) (TSMAudioDevice VRP Module 170). In accordance with this embodiment, the audio Renderer part of TSMAudioDevice object 150 (i.e., TSMAudioDevice Audio Renderer 160) is a Timing Renderer (a more general definition of a Timing Renderer is provided below) for Presentation System 100. Note that the RealNetworks® RealPlayer® application does not include support for variable rate playback. However, Plug-In 180 comprises a product called a 2×AV Plug-In is available from Enounce, Incorporated of Palo Alto, Calif. When the 2×AV Plug-In is installed on a computer that has had the RealPlayer® application previously installed, it "plugs into" the RealPlayer® application, and adds variable rate playback capability thereto. The 2×AV Plug-In has its own User Interface, which includes a slider that a user can manipulate to adjust playback rate. In operation, the 2×AV Plug-In communicates with TSMAudioDevice object 150 by sending messages through an object called State Information Exchange Server 190 ("SIX Server 190").

Thus, in accordance with this embodiment, TSMAudioDevice object 150 accepts messages from SIX Server 190 that specify a desired playback or presentation rate. Playback or presentation rate values can range from 0.3 to 3.0 (a rate of 1.0 is normal; a rate of 0.3 is 30% of the normal rate; and a rate of 3.0 is three times faster than the normal speed). TSMAudioDevice object 150 receives SIXExchange messages from SIX Server 190, and stores a requested playback rate value contained in these messages as a new value of an internal Current Presentation Rate parameter or property. In addition, as shown in FIG. 1, TSMAudioDevice object 150 receives buffers 200 of audio data to be rendered (i.e., played out through the computer's sound card) from Player Core object 120. When TSMAudioDevice object 150 receives buffers 200 of audio data to be rendered, it is processed by TSMAudioDevice VRP Module 170. TSMAudioDevice VRP Module 170 processes buffers 200 through a library of signal processing routines, for example, a suitable library of signal processing routines called the Time Scale Tailor package is available from Enounce, Incorporated of Palo Alto, Calif. In accordance with this embodiment, this library carries out digital signal processing procedures on buffers 200 of audio samples that has the effect of reducing the number of samples in the buffer (when playing faster than real time) or increasing the number of samples in the buffer (when playing slower than real time), thereby effectively changing the playback rate. For example, in accordance with this embodiment, processing the buffer using the library decreases or increases the samples in a particular way so as to leave the perceptual and linguistic information in the buffers unchanged, but to change the duration of the buffers. Additionally, playback rate parameters, unmodified and modified buffer lengths and Rendering Period values, and other time-related values are calculated by TSMAudioDevice VRP Module 170, and are stored with each audio buffer. Then, modified audio data buffers 210 are stored by TSMAudioDevice VRP Module 170 for presentation by TSMAudioDevice Audio Renderer 160. TSMAudioDevice Audio Renderer 160 comprises Audio Renderer Core Object 165 that submits modified buffers 210 for processing to the computer's audio electronics, for example, Computer Sound Card 220. For example, as shown in FIG. 1, Core Object 165 comprises an interface known as a WAV driver. This interface is defined by Microsoft, and is supported by the Windows operating system.

On a regular basis during playback or presentation, Player Core object 120 calls a method implemented by TSMAudioDevice object 150 called GetCurrentAudioTime( ). This method returns a Current Time in milliseconds. Additionally, every time a buffer of audio samples is processed (for example, buffer 200), TSMAudioDevice object 150 is responsible for calling a Player Core object 120 method called OnTimeSync( ), and passing to the Player Core object 120 method the Current Time in milliseconds. Player Core object 120 interprets both of these times as Data Times. In this embodiment, Presentation System 100 (other than TSMAudioDevice object 150) does not support the concept of Presentation Times that are different than Data Times. To do this, in accordance with one embodiment of the present invention, TSMAudioDevice object 150 carries out methods described below to convert Presentation Time (for example, as reported by its WAV driver Core object routines) into Data Time (as needed by Player Core object 120).

Figure 2:
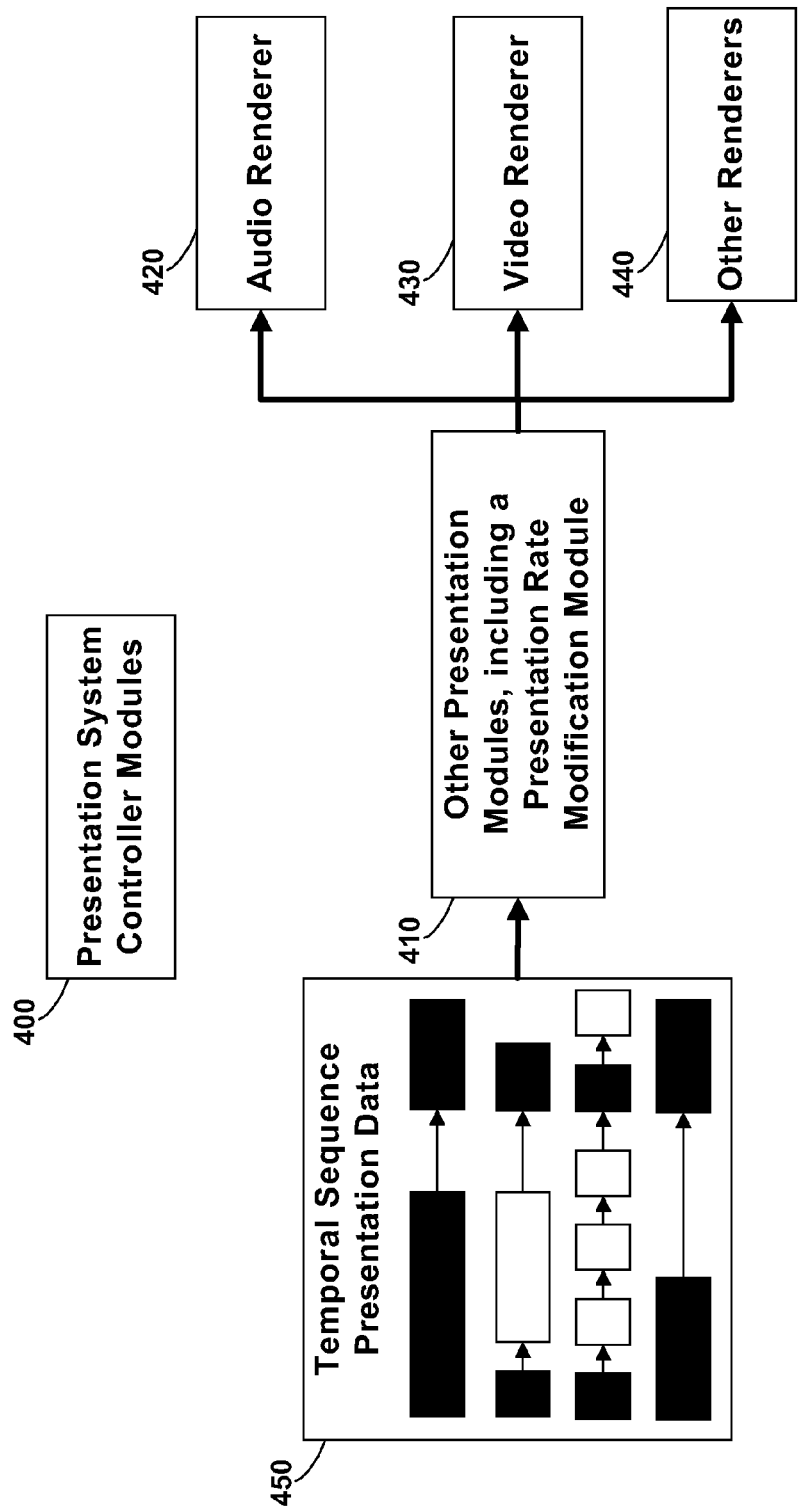
FIG. 2 shows a block diagram of a generalized Presentation system according to one embodiment of the present invention that includes Presentation System Controller Modules, other Presentation Modules (including a Presentation Rate Modification Module), and a number of Renderers.

Before describing the methods to convert Presentation Time into Data Time, we present generalizations of the matters described above in conjunction with FIG. 2. In particular, FIG. 2 shows a block diagram of a generalized Presentation system that includes: Presentation System Controller Modules 400, Other Presentation Modules 410 (including a Presentation Rate Modification Module), and a number of Renderers, for example, Audio Renderer 420, Video Renderer 430, and Other Renderers 440. Further, as shown in FIG. 2, Temporal Sequence Presentation Data 450 is applied as input to Other Presentation Modules 410.

As defined herein, a Presentation System means a system or method that: (a) acquires, interprets, decodes, and manages presentation of Temporal Sequence Presentation Data (defined below); (b) selects, instantiates, initializes, controls, and monitors Renderers (defined below); (c) initiates a presentation by determining which presentation data elements are to be submitted first to which Renderers, effecting such submission, and causing the Renderers to begin processing; (d) maintains a Current Time parameter, whose value is regularly updated in a monotonically-increasing fashion during linear presentation (the value may be set to zero or any other value when presentation is stopped, or a jump is performed to a non-sequential location) —the Presentation System may maintain and update the value of the Current Time parameter by identifying a Renderer that can reliably maintain and update its Cumulative Rendition Period, and arrange to acquire the value of that parameter at regular intervals; (e) distributes its Current Time parameter to other Presentation Modules as needed; and (f) manages the presentation process, including by determining which data elements should be submitted next to which Renderers, and by comparing its Current Time value to the Data Time of those data elements, thereby determining when to effect such submission.

A digital media player is a common type of Presentation System, but there are many other types of Presentation Systems. For example, a controller that processes a script which causes digitally-controlled manufacturing equipment to make a printed circuit board is also a Presentation System, as is a controller that processes a script which causes a robot to perform a dance.

As defined herein, a Renderer is a system or method having the following characteristics: (a) the Renderer processes Temporal Sequence Presentation Data (defined below); (b) the Renderer processes data elements in an ordered sequence in which "earlier" elements are processed before "later" elements (the order may be determined by the order in which the elements are submitted to the Renderer, or by the Data Times (defined below) of the elements, or by using other techniques); (c) processing a data element takes a finite amount of time (possibly but not typically zero) known as the Rendition Period of the data element; (d) processing a sequence of data elements takes a finite amount of time directly related to the sum of the Rendition Periods of the individual elements, and, potentially, some other factors (the amount of time required to process (render) a sequence of data elements is called a Cumulative Rendition Period for those elements); and (e) at least one instance of a Renderer (often associated with rendering of audio data) has a capability of reporting back to a module, for example, a Presentation System Control Module, upon request, a current value of the Cumulative Rendition Period (a Renderer that is consistently used by the Presentation System in this fashion is referred to as a Timing Renderer).

As defined herein, Temporal Sequence Presentation Data, also referred to as Presentation Data, means data having the following characteristics: (a) the purpose, utility, or semantics of the data is closely associated with its presentation—presentation involves rendering of the data to achieve some effect (including but not limited to constituting a visible and/or audible presentation that can be monitored by a human being); (b) there are a plurality of rendering processes capable of effecting an appropriate presentation of the data; (c) the data comprises a set of elements; (d) each data element has a Rendition Type that corresponds to a type of Renderer that can be used to render the data element—some common Rendition Types are Pulse Code Modulation (PCM) audio, MPEG video, and JPEG images; (e) one or more Rendition Types may be Time-Distinguished Rendition Types—Time-Distinguished Rendition Types are Rendition Types of Temporal Sequence Presentation Data whose intrinsic characteristics and whose natural rendition process make them preferred candidates for defining and maintaining a system-wide Current Time parameter (note that most audio Rendition Types are Time-Distinguished Rendition Types); (f) associated with each element is a Data Time—the Data Time of some elements may be explicitly represented as part of the element (such elements are called Timestamped Elements), and the Data Time of some elements may be derivable only by performing or simulating an appropriate rendering process on all or part of the Presentation Data (such elements are called Sequential Elements); (g) the elements have a partial ordering, so that when performing rendering operations on the data it is possible to determine i) which data elements to deliver to the Renderers to begin the presentation process; and ii) given that the presentation process has reached a certain point, which data elements to deliver to the Renderers next to continue the presentation process; and (h) associated with each element is a Rendition Period—the Rendition Period is the length of time the rendering process should last for that element, where the Rendition Period of an element may be specified in many different ways, including but not limited to the following: (i) as a value explicitly stored as part of the element, (ii) as a fixed value associated with that type of data element, and stored in a header field of the Presentation Data, (iii) as a fixed value associated with a Presentation System, (iv) a difference between the Data Time of the element and the Data Time of a following element that would be submitted to the same Renderer in the course of presentation (i.e., the element is rendered until there is another element to be rendered by the same Renderer), (v) as a fixed property of the rendering process.

As defined herein, a Variable Rate Presentation ("VRP") Module (also known as a VRP Module) means a module that: (a) accepts control commands and messages from the Presentation System; (b) maintains and, in response to commands from the Presentation System, updates the value of a Current Presentation Rate parameter where values of this parameter have the following interpretation: (i) a value of 1.0 means that presentation is to take place at the "normal" or default rate, (ii) a value less than 1.0 but greater than zero means that presentation is to take place slower than "normal" (the factor by which presentation is to be slowed down is equal to the inverse of the Current Presentation Rate value), (iii) a value greater than 1.0 means that presentation is to take place faster than "normal" (the factor by which presentation is to be sped up is equal to the Current Presentation Rate value), and (iv) a value less than zero is interpreted identically to the corresponding positive value of the parameter, but the direction of presentation is reversed (i.e., the presentation "runs in reverse"); (c) processes Temporal Sequence Presentation Data; (d) modifies Temporal Sequence Presentation Data in a manner consistent with the value of the Current Presentation Rate parameter and the Renderers to which the data will be later submitted, having the effect that the rate with which processing takes places will track the value of the Current Presentation Rate parameter. The implementation of Variable Rate Presentation may also involve one or more Renderers. In this case the value of the Current Presentation Rate parameter is attached to the data elements, or otherwise communicated to the appropriate Renderers.

In a Presentation System fabricated in accordance with one embodiment of the present invention, the Presentation System would maintain two separate values of the Current Time parameter. The first of the values would be a Current Data Time value that indicates the largest Data Time value of any data element that has already been submitted for rendering, or should have already been submitted for rendering. The second of the values would be a Current Presentation Time value, which would be the Cumulative Rendition Period of all data elements submitted since presentation began (i.e., the elapsed rendering time). In a Presentation System fabricated in accordance with another embodiment of the present invention, the Presentation System would maintain a single value of the Current Time parameter. Such an embodiment is typical of Presentation Systems that were not designed with the notion of variable rate playback in mind. More specifically, some such systems were designed with an implicit assumption that the only possible presentation rate was 1.0.

Presentation Time and Data Time are identical properties in traditional Presentation Systems, such as media players. However, when a Presentation System is enhanced with a Variable Rate Presentation ("VRP") capability, these properties are no longer the same. We have discovered that this presents a problem when a traditional media player or other Presentation System is enhanced with a VRP capability, for two reasons. First, if a Presentation System Control Module only acquires a single Current Time value from a Timing Renderer, it is probably assuming that that value can be interpreted as both Current Data Time and Current Presentation Time. If these times are not equal, at least one of those assumptions will be in error. Secondly, if a single Current Time value is distributed to multiple components, some of which interpret the value as Current Data Time, and some of which interpret the value as Current Presentation Time, at least one of these interpretations will be in error. We have invented a way to convert Presentation Time to Data Time, and we have invented a method for reporting Presentation Time when only one time can be returned.

In accordance with one embodiment of the present invention, certain time-related properties (that will later be used to calculate Current Presentation Time and Current Data Time) are associated with Temporal Sequence Presentation Data elements by taking the following steps.

Step 1: from time to time as a user or some other controlling entity decides to change a rate of presentation, the Presentation System Control Module sends a message to a Variable Rate Presentation Module (VRP Module), specifying an updated value for a Current Presentation Rate parameter. When the VRP Module receives this message, it updates the value of its Current Presentation Rate parameter.

Step 2: in preparation for presentation, the Presentation System organizes Temporal Sequence Presentation Data elements (for example, audio samples) into collections called buffers.

Step 3: buffers are presented in an ordered or semi-order fashion for Presentation Rate modification and rendering, typically according to the Data Time of the first data element in a buffer.

Step 4: the number of unmodified samples in each buffer is determined, and the Unmodified Rendition Period of each element is obtained. The value of the Current Presentation Rate parameter is held constant (i.e., it is not allowed to change) while the VRP Module is processing a buffer. Also, the Rendition Period of all data elements in a buffer is constrained to be equal. Note, however, if it were desired to vary either the Current Presentation Rate or the Rendition Period within a buffer, that buffer could be broken down into multiple smaller buffers in which those properties were constant. In doing so, if necessary, each buffer could hold only a single data element.

Step 5: the Unmodified Cumulative Rendition Period for the buffer is calculated and retained as a property of the buffer by multiplying the Rendition Period of each data element in the buffer by the number of unmodified data elements in the buffer.

Step 6: the Data Time of the buffer is defined to be the Data Time associated with the first unmodified data element in the current buffer. The Data Time is acquired or calculated, and retained as a property of the buffer. If it is not directly specified as a property of the first data element of the current buffer, it can be calculated by adding the Data Time of the previous buffer to the Unmodified Cumulative Rendition Period of the previous buffer.

Step 7: the data elements in the current buffer are presentation rate modified, so that the ratio of the Cumulative Rendition Period of the buffer prior to presentation rate modification, divided by the Cumulative Rendition Period of the buffer following modification, is substantially equal to the Current Presentation Rate.

Step 8: the number of modified data elements in the modified buffer, and the Modified Rendition Period of each data element in the buffer, is determined and retained as a property of the buffer.

Step 9: the Modified Cumulative Rendition Period for the buffer is calculated and retained as a property of the buffer by multiplying the Modified Rendition Period of each data element in the buffer by the number of modified data elements in the buffer.

Step 10: the Modified Presentation Time of the buffer is defined to be the Presentation Time associated with the first modified data element in the buffer. This time is calculated and retained as a property of the buffer. It is calculated by adding to the Modified Presentation Time of the first modified data element of the previous buffer, the Modified Cumulative Rendition Time of the previous buffer.

Step 11: calculate, and retain as a property of the current buffer, the Cumulative Modified Data Element Count associated with the first data element in the current buffer by adding the Cumulative Modified Data Element Count associated with the first modified data element in the previous buffer to the number of modified data elements in the previous buffer.

Note that in this embodiment only the VRP Module needs to be informed of the current value of the Presentation Rate parameter. Renderer Modules, on the other hand, get all of their information about Presentation Rate from the buffer properties described above.

Figure 6:
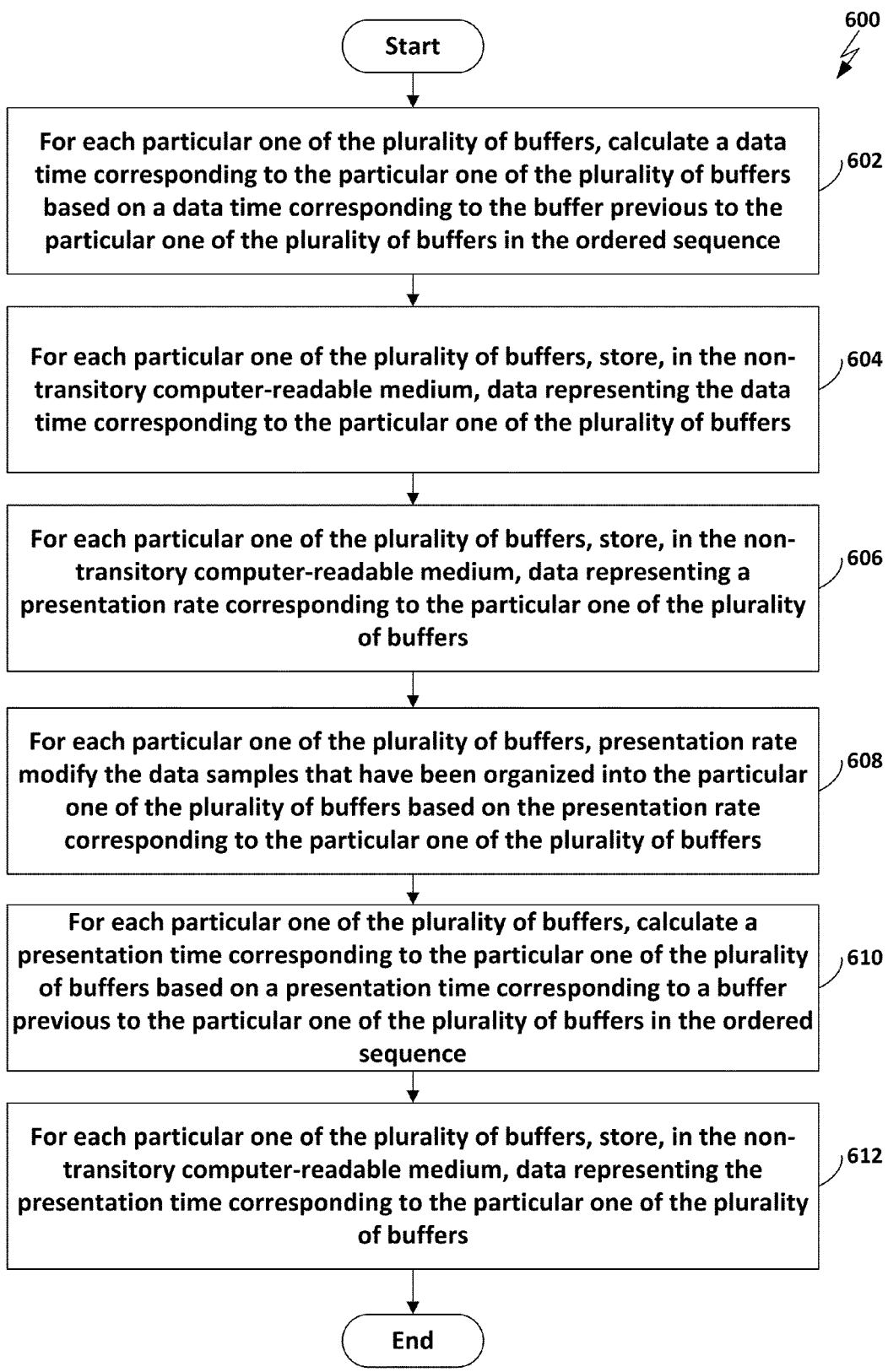
FIG. 6 is a flowchart of a method for associating data with a plurality of buffers and for storing representations of the associated data.

Referring to FIG. 6, a flowchart is shown which illustrates a method 600 according to one embodiment of the present invention. The method 600: (1) calculates, for each particular one of a plurality of buffers, a data time corresponding to the particular one of the plurality of buffers based on a data time corresponding to the buffer previous to the particular one of the plurality of buffers in the ordered sequence (step 602); (2) stores, in a non-transitory computer-readable medium, for each particular one of the plurality of buffers, data representing the data time corresponding to the particular one of the plurality of buffers (step 604); (3) stores, in the non-transitory computer-readable medium, for each particular one of the plurality of buffers, data representing a presentation rate corresponding to the particular one of the plurality of buffers (step 606); (4) presentation rate modifies, for each particular one of the plurality of buffers, the data samples that have been organized into the particular one of the plurality of buffers based on the presentation rate corresponding to the particular one of the plurality of buffers (step 608); (5) calculates, for each particular one of the plurality of buffers, a presentation time corresponding to the particular one of the plurality of buffers based on a presentation time corresponding to a buffer previous to the particular one of the plurality of buffers in the ordered sequence (step 610); and (6) stores, in the non-transitory computer-readable medium, for each particular one of the plurality of buffers, data representing the presentation time corresponding to the particular one of the plurality of buffers (step 612).

In accordance with one embodiment of the present invention, each Renderer is assumed to comprise a Core component. This Core component may be hardware, software, or a combination of hardware and software. For example, the Core component of an audio Renderer may be a Sound Card and its associated driver software. The Core component performs the essential rendering process for the particular Type of Temporal Sequence Presentation Data that the Renderer processes.

In accordance with one embodiment of the present invention, the Core component can be asked at any point in time to report the number of data elements rendered since a distinguished event such as, for example, an invocation of an Initialize or Clear command. Equivalently, the Core component rendering hardware or software may be able to report the number of milliseconds of rendering that has occurred since a distinguished event.

Renderers, especially Timing Renderers, must decide how to respond when other components of the Presentation System ask for the Current Time value without specifying whether Presentation Time or Data Time is desired. In many cases it is possible to determine that the Presentation System really wants to know what the Current Data Time is. Therefore in accordance with one embodiment of the present invention, a certain Data Time is returned when a request is made for the Current Time. For this, and other reasons, Renderers, especially Timing Renderers, must maintain an up-to-date and accurate value for both the Presentation Time and the Data Time associated with the data element currently being rendered. In accordance with one embodiment of the present invention, it is the Data Time of the data element currently being rendered by the Core component that is returned as the Current Time when the Current Time is requested by another module. Therefore, in accordance with one embodiment of the present invention, Current Presentation Time and Current Data Time are calculated by taking the following steps.

Step 1: a modified buffer with its associated properties as described above is submitted to an appropriate Renderer.

Step 2: if the Renderer's Core component is capable of reporting the number of milliseconds of rendering that has occurred since a distinguished event, and the Modified Presentation Time of this modified buffer is zero (or some other distinguished value), the Renderer triggers the distinguished event in its Core component.

Step 3: the Renderer submits the contents of the buffer to its Core component.

Step 4: the Renderer also stores each modified buffer in some method that allows ready access to all of the buffer properties until it has determined that all data elements in the buffer have been rendered.

Step 5: if the Core component is capable of reporting the number of data elements rendered since a distinguished event occurred, the Renderer calculates the Current Data Time and the Current Presentation Time using the following algorithm.

Step 5a: it asks its Core component for the cumulative number of data elements rendered.

Step 5b: it determines which buffer the next data element to be rendered will have come from, by identifying the particular buffer that has for its Cumulative Modified Data Element Count the largest cumulative sample number less than or equal to the reported number of data elements rendered—this buffer is referred to as the current rendering buffer.

Step 5c: the current Data Time is equal to the Data Time of the current rendering buffer, plus an offset.

Step 5d: the offset is calculated by multiplying the unmodified buffer duration by the Completion Fraction.

Step 5e: the Completion Fraction is calculated by subtracting the cumulative sample number associated with the first sample in the current rendering buffer from the Core component's reported number, and dividing the result by the number of modified samples in the buffer.

Step 5f: the Current Presentation Time is equal to the Modified Presentation Time of the current rendering buffer, plus an offset.

Step 5g: the offset is calculated by multiplying the buffer's Modified Cumulative Rendition Period by the Completion Fraction.

Step 6: if the Core is capable of reporting the number of milliseconds of rendering that has occurred since a distinguished event, the Renderer calculates the Current Data Time and the Current Presentation Time using the following algorithm.

Step 6a: it asks its Core component for the number of milliseconds of rendering that has occurred.

Step 6b: it determines which buffer the next data element to be rendered will have come from by identifying the particular audio buffer that has for its Modified Presentation Time the largest value less than or equal to the Core's reported value— this buffer is referred to as the current rendering buffer.

Step 6c: the current Data Time is equal to the Data Time of the current rendering buffer, plus an offset.

Step 6d: the offset is calculated by multiplying the unmodified buffer duration by the Completion Fraction.

Step 6e: the Completion Fraction is calculated by subtracting the Modified Presentation Time of the current rendering buffer from the Core component's reported value, and dividing the result by the Cumulative Modified Rendering Period of the buffer.

Step 6f: the Current Presentation Time is equal to the Modified Presentation Time of the current rendering buffer, plus an offset.

Step 6g: the offset is calculated by subtracting the Modified Presentation Time of the current rendering buffer from the Core component's reported value.

Step 6h: the current Data Time is reported to the player as the Presentation Time.

Step 7: whenever an object requests the Current Time, the Renderer computes an updated value for the Presentation Time and Data Time, and reports either or both times as appropriate.

Let us define a temporal processing element as a sequence of Temporal Sequence Presentation Data samples over which the Current Presentation Rate does not change from one sample in the sequence to the next, and the default Rendition Period does not change from one sample in the sequence to the next. Such an element may comprise one or more data samples. Any sequence of Temporal Sequence Presentation Data samples can thus be considered to be organized into a sequence of temporal processing elements, each comprising one or more samples.

Figure 3A:
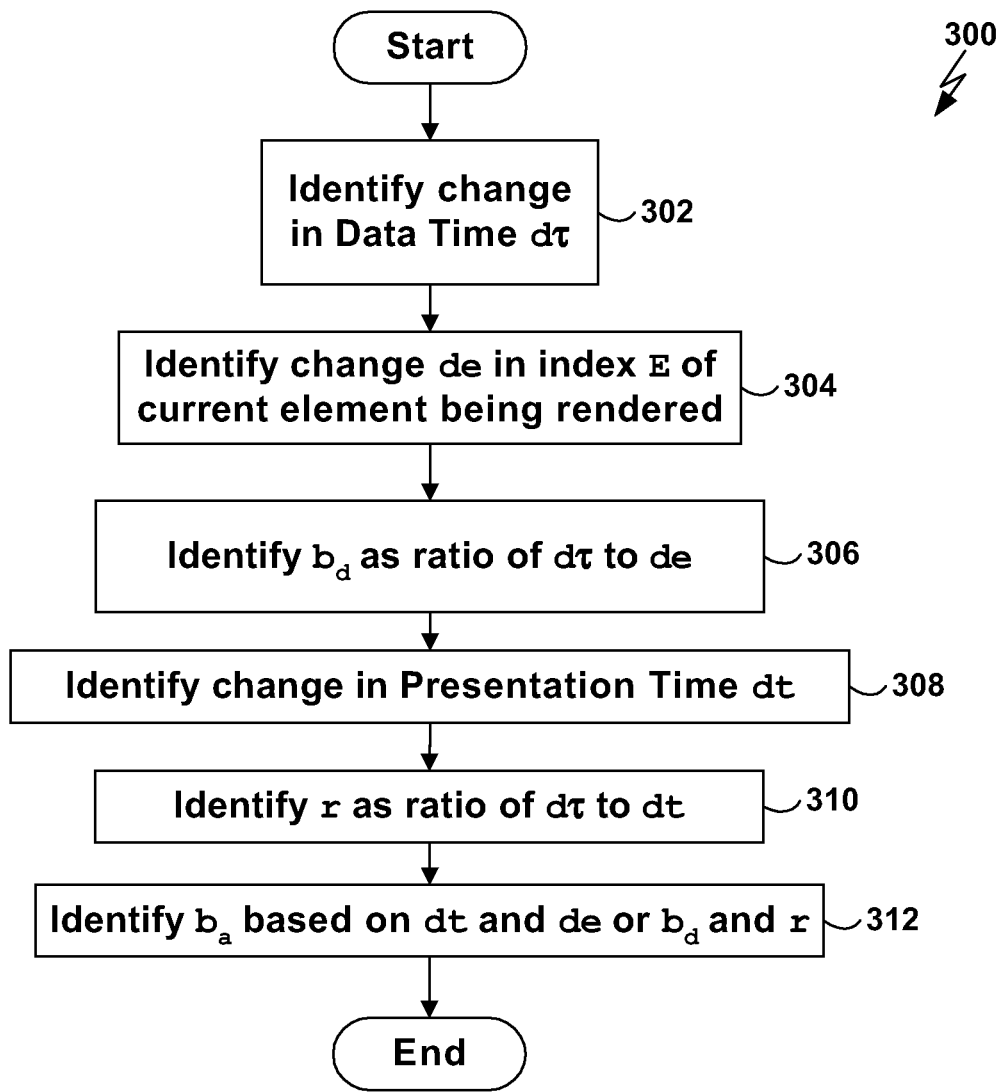
FIG. 3A is a flowchart of a method for identifying values of presentation-related parameters according to one embodiment of the present invention.

Referring to FIG. 3A, a flowchart is shown of a method 300 for identifying the values of various presentation-related parameters according to one embodiment of the present invention. Note that the steps illustrated in FIG. 3A need not be performed in the sequence illustrated. Furthermore, steps may be added to and/or removed from the method 300 illustrated in FIG. 3A to identify the values of desired properties.

The default period $b_d$ of an element is the Rendition Period of such an element when it is rendered at normal speed. Thus $b_d$ is the ratio of $d\tau$, the change in Data Time, (which may be identified in step 302) and de, the change in the index E of the current element being rendered (which may be identified in step 304), as shown in Equation 1 (step 306).

$$b_d = d\tau/de \qquad \text{Equation 1}$$

The presentation rate r is equal to the ratio of $d\tau$, the change in Data Time, and dt, the change in Presentation Time, (which may be identified in step 308), as shown in Equation 2 (step 310).

$$r = d\tau/dt \qquad \text{Equation 2}$$

The actual period $b_a$ of an element is the Rendition Period of such an element when it is rendered at the current Presentation Rate. Thus $b_a$ is the ratio of dt, the change in Presentation Time, and de, the change in the index E of the current element being rendered, as shown in Equation 3 (step 312).

$$b_a = dt/de = b_d/r \qquad \text{Equation 3}$$

At any instant in the rendition of Temporal Sequence Presentation Data, the relationship between $b_d$, $b_a$, r, the element index E, the Data Time $T_D$, and the Presentation Time $T_P$, can be expressed in integral form. For a system in which the initial value of both Data Time and Presentation Time are zero before playback begins, the current Data Time $T_D$ at Presentation Time $T_P$ is given by Equation 4.

$$T_D = \int_0^{T_P} d\tau = \int_0^{T_P} r \, dt \qquad \text{Equation 4}$$

Figure 3B:
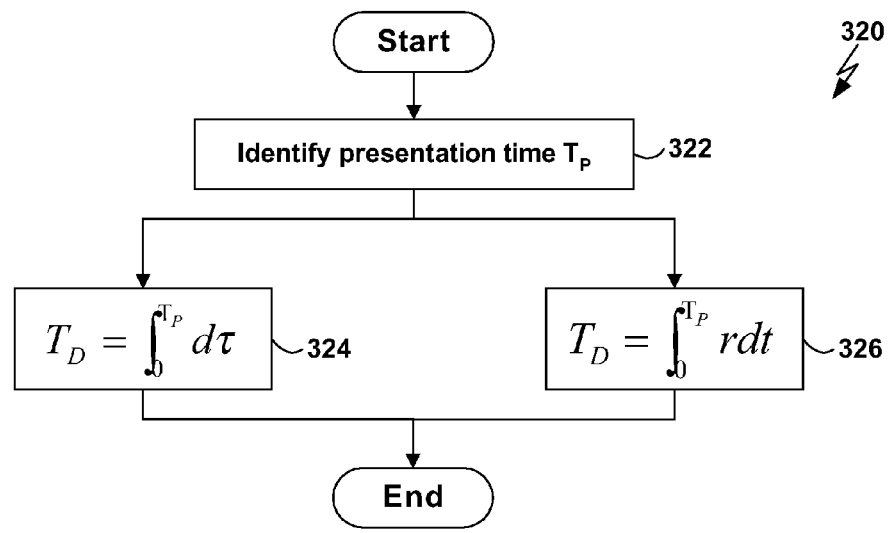
FIG. 3B is a flowchart of a method for identifying a current Data Time based on a current Presentation Time according to one embodiment of the present invention.

Therefore, the current Data Time $T_D$ at Presentation Time $T_P$ may be identified using the method 320 illustrated in FIG. 3B. The current Presentation Time $T_P$ is identified (step 322) and the current Data Time $T_D$ is identified either by integrating over $d\tau$ (step 324) or over rdt (step 326).

The current Data Time $T_D$ at element index E is given by Equation 5:

$$T_D = \int_0^E d\tau = \int_0^E r \, dt = \int_0^E r \cdot b_a \, de = \int_0^E b_d \, de \qquad \text{Equation 5}$$

Figure 3C:
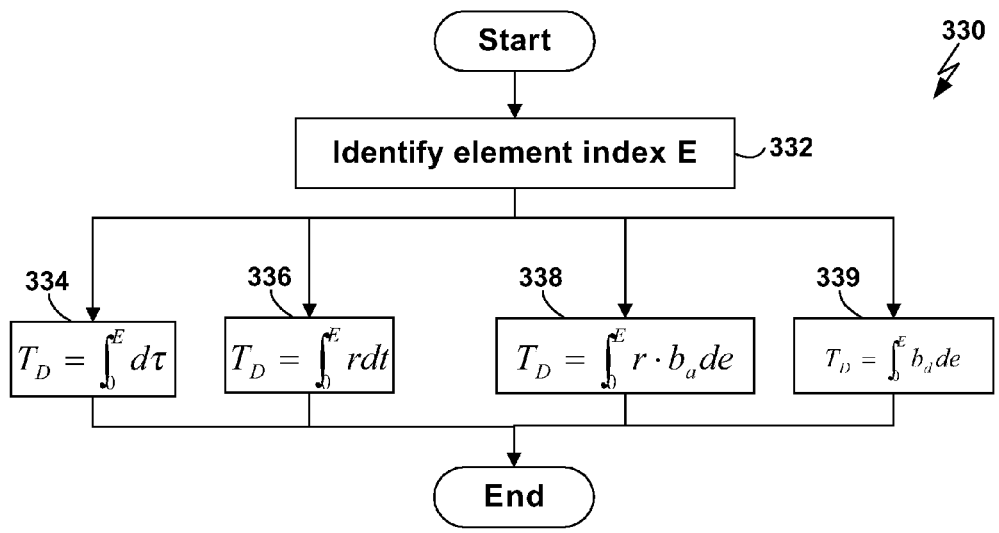
FIG. 3C is a flowchart of a method for identifying a current Data Time based on a current element index according to one embodiment of the present invention.

Therefore, the current Data Time $T_D$ at element index E may be identified using the method 330 illustrated in FIG. 3C. The current element index E is identified (step 332) and the current Data Time $T_D$ is identified either by integrating over $d\tau$ (step 334), rdt (step 336), $rb_a de$ (step 338), or $b_a de$ (step 339).

The current Presentation Time $T_P$ at Data Time $T_D$ is given by Equation 6.

$$T_P = \int_0^{T_D} dt = \int_0^{T_D} r^{-1} d\tau \qquad \text{Equation 6}$$

Therefore, the current Presentation Time $T_P$ at Data Time $T_D$ may be identified using the method 340 illustrated in FIG. 3D. The current Data Time $T_D$ is identified (step 342) and the current Presentation Time $T_P$ is identified either by integrating over dt (step 344) or over $r^{-1} d\tau$ (step 346).

The current Presentation Time $T_P$ at element index E is given by Equation 7.

$$T_P = \int_0^E dt = \int_0^E r^{-1} d\tau = \int_0^E (b_d/r) de = \int_0^E b_a de \qquad \text{Equation 7}$$

Therefore, the current Presentation Time $T_P$ at element index E may be identified using the method 350 illustrated in FIG. 3E. The current element index E is identified (step 352) and the current Presentation Time $T_P$ is identified either by integrating over dt (step 354), $r^{-1} d\tau$ (step 356), $(b_d/r) de$ (step 358), or $b_a de$ (step 359).

Those having ordinary skill in the art will understand how to add arbitrary constants to either the Data Time or Presentation Time calculations above to accommodate situations in which the initial values of those times are nonzero.

In one embodiment of a system in which Data Time and Presentation Time values may differ, each sample buffer is considered to be a temporal processing element. A Current Presentation Rate parameter r is associated with each such element. A Modified Cumulative Rendition Period $b_a$, and an Unmodified Cumulative Rendition Period $b_d$, is associated with each element.

Figure 3F:
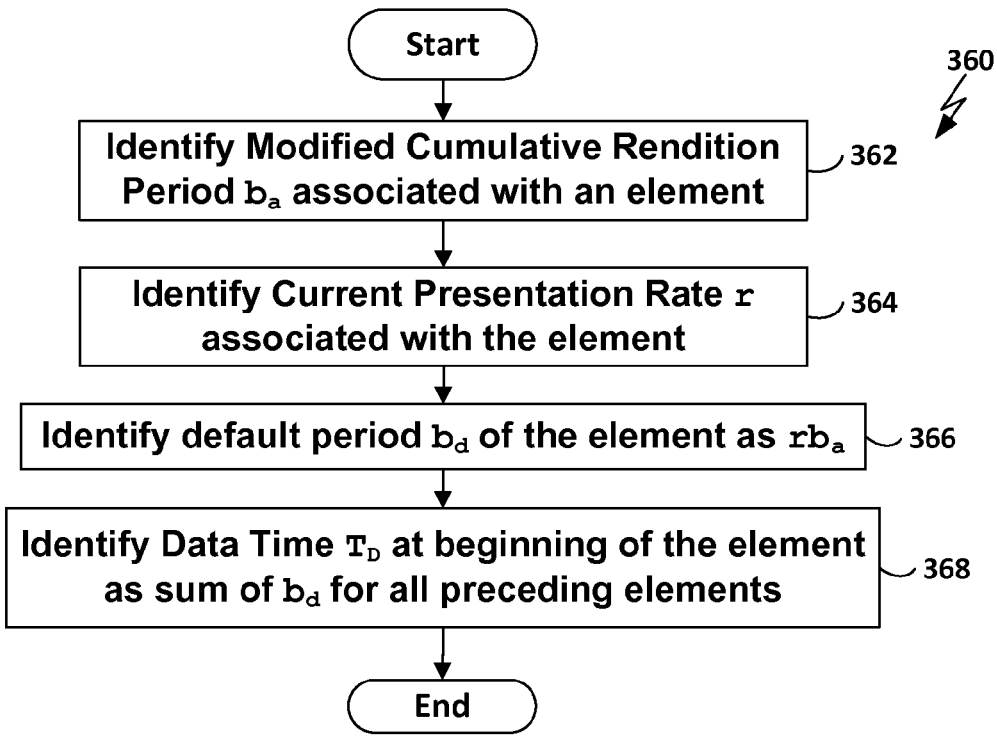
FIG. 3F is a flowchart of a method for identifying an Unmodified Cumulative Rendition Period for an element and a Data Time at the beginning of the element according to one embodiment of the present invention.

Referring to FIG. 3F, a flowchart is shown of a method 360 that may be used in such an embodiment to identify the value of $b_d$ for a particular element and for identifying the Data Time $T_D$ at the beginning of the element. The Modified Cumulative Rendition Period $b_a$ for the element is identified (step 362). The Current Presentation Rate r associated with the element is identified (step 364). The value of $b_d$ for the element is identified as the product of $b_a$ and r for that element (step 366). The Data Time $T_D$ at the beginning of the element is identified as the sum of the values of $b_d$ for all of the preceding elements (step 368). Note that the values of $b_d$ for the preceding elements may be identified by iteratively applying steps 362-366 to those elements.

Figure 3G:
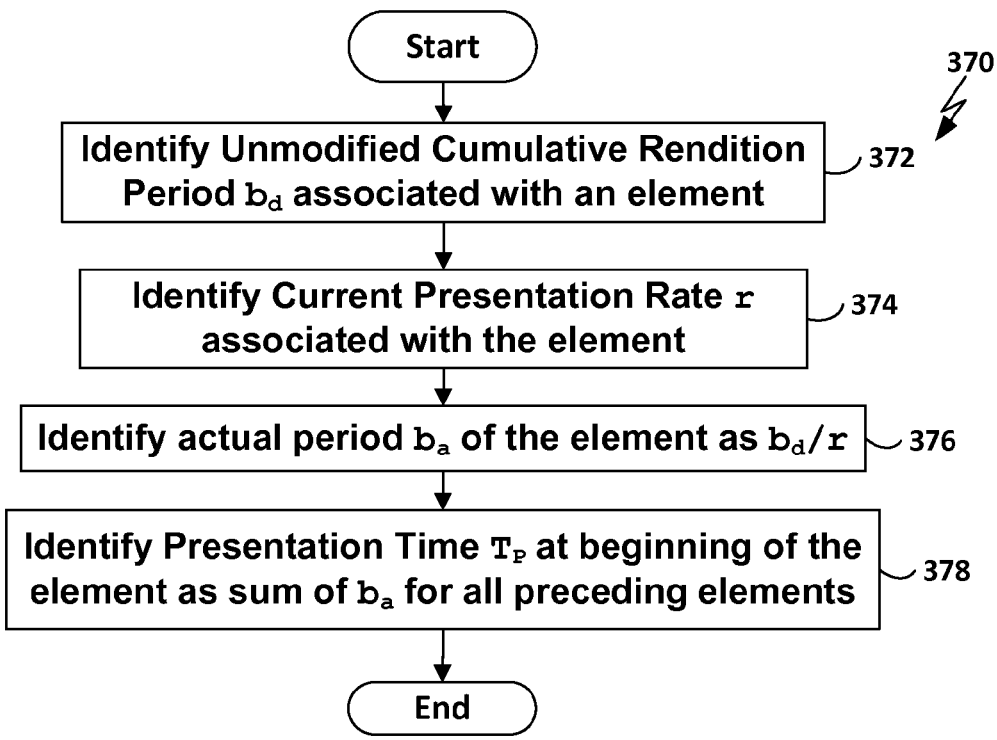
FIG. 3G is a flowchart of a method for identifying a Modified Cumulative Rendition Period for an element and the Presentation Time at the beginning of the element according to one embodiment of the present invention.

Referring to FIG. 3G, a flowchart is shown of a method 370 that may be used in such an embodiment to identify the value of $b_a$ for a particular element and for identifying the Presentation Time $T_P$ at the beginning of the element. The Unmodified Cumulative Rendition Period $b_d$ for the element is identified (step 372). The Current Presentation Rate r associated with the element is identified (step 374). The value of $b_a$ for the element is identified as the quotient of $b_d$ and r for that element (step 376). The Presentation Time $T_P$ at the beginning of the element is identified as the sum of the values of $b_a$ for all of the preceding elements (step 378). Note that the values of $b_a$ for the preceding elements may be identified by iteratively applying steps 372-376 to those elements.

It is not necessary to store both $b_d$ and $b_a$ for an element. Either value can be stored, and the other calculated from that stored value and the value of r for the element. Alternatively, the value of both $b_d$ and $b_a$ for an element may be stored, and r calculated as $b_d$ divided by $b_a$.

In one embodiment of a system in which Data Time and Presentation Time values may differ, the sequence of temporal processing elements that are rendered are assigned positive index values, so that the nth element rendered has index value n. A Current Presentation Rate parameter $r_n$ is associated with the nth such element. A Modified Cumulative Rendition Period $b_{a,n}$, and an Unmodified Cumulative Rendition Period $b_{d,n}$, is associated with the nth element. The Presentation Time at the beginning of the nth element is $T_{P,n}$, and the Data Time at the beginning of the nth element is $T_{D,n}$. An Average Presentation Rate parameter $R_n$ is associated with the nth element. This parameter is defined as shown in Equation 8:

$$R_n = T_{D,n}/T_{P,n} \qquad \text{Equation 8}$$

In such an embodiment, the Data Time parameter $T_{D,n}$ does not have to be explicitly maintained by the system, but instead may be calculated as needed as shown, for example, in Equation 9:

$$T_{D,n} = T_{P,n} \cdot R_n \qquad \text{Equation 9}$$

Furthermore, $R_n$, the value of the Average Rate parameter of the nth element, may be calculated without identifying the values of the Data Time parameter or the Unmodified Cumulative Rendition Period of any of the elements presented, as shown, for example, in Equation 10:

$$R_1 = 1 \qquad \text{Equation 10}$$
$$R_n = \left(\frac{T_{P,n-1}}{T_{P,n}}\right) R_{n-1} + \left(\frac{b_{a,n-1}}{T_{P,n}}\right) r_{n-1}: \text{ for } n > 1$$

Alternatively, the Presentation Time parameter $T_{P,n}$ does not have to be explicitly maintained, but instead may be calculated as needed as shown in Equation 11:

$$T_{P,n} = T_{D,n} \cdot R_n^{-1} \qquad \text{Equation 11}$$

In Equation 11, $R_n^{-1}$ is the inverse of the Average Rate parameter of the nth element. $R_n^{-1}$ may be calculated without identifying the values of the Presentation Time parameter or the Modified Cumulative Rendition Period for any of the elements presented, as shown, for example, in Equation 12:

$$R_1^{-1} = 1 \qquad \text{Equation 12}$$
$$R_n^{-1} = \left(\frac{T_{D,n-1}}{T_{D,n}}\right) R_{n-1}^{-1} + \left(\frac{b_{d,n-1}}{T_{D,n}}\right) r_{n-1}^{-1}: \text{ for } n > 1$$

When a component of a traditional player system that has been enhanced to support variable speed playback requests the value of the Current Time from a Timing Renderer (or other component capable of providing temporal information), several issues may be considered in order to return an appropriate value for the Current Time. The appropriate value for the Timing Renderer to return may differ from one request to another.

First, the Timing Renderer may determine whether to return a time value based on the current Data Time or a time value based on the current Presentation Time. In a traditional player, these two times are the same, but in a player capable of variable speed playback, or simply capable of differentiating between Data Time and Presentation Time, those two values are in general different. In some circumstances, it may be desirable to respond to a request for the Current Time with a time value that is based on the current Presentation Time. In other circumstances, however, it may be desirable to respond with a time value that is based on the current Data Time. The performance of the system is enhanced, therefore, in various embodiments of the present invention by enabling the Timing Renderer to return a time value that is derived from an appropriate one of the current Data Time and current Presentation time, based on the circumstances.

Moreover, it is commonly the case that the requesting component will either add an offset to the time returned, thus in effect calculating an earlier or later time, or subtract the time returned from another time, thus in effect calculating a temporal differential. In many cases the function performed by such an addition or subtraction is such that the calculated time or temporal differential would benefit from being adjusted by taking into account the current presentation rate, or some value determined by the course of previous or future variations in presentation rate. But because the requesting component is not aware that playback speeds are variable, it does not make such an adjustment.

In summary, in various embodiments of the present invention in which a traditional player system is enhanced to support variable speed playback, the performance of the system may be improved by ensuring that the Timing Renderer determines whether to base the time value returned on the Current Presentation Time or the Current Data Time when a component asks for the Current Time. Furthermore, in various embodiments of the present invention, the time returned is adjusted to take into account the current presentation rate, or a sequence of variations in presentation rates, to further improve system performance.

In general, an advantageous strategy for the Timing Renderer to employ in responding to an ambiguous request for the Current Time is to identify which of a number of known "time value request cases" the current request is an instance and, based on this identification, to select an algorithm to use to calculate an appropriate time value to return. In general an appropriate time value algorithm may make use of a base time and a set of algorithm-specific parameters whose values the Timing Renderer may identify on a case-by-case base. This strategy is shown in a flow chart in FIG. 4.

The Timing Renderer receives a request for a Current Time value (step 402). The Timing Renderer identifies relevant characteristics of the timing request (referred to herein as the "distinguishing signature" of the request) (step 404). The Timing Render identifies the known time value request case of which the current request is an instance (step 406).

The Timing Renderer selects, based on the identified distinguishing signature and request case, an algorithm to use to calculate an appropriate time value to return (step 408). The Timing Renderer identifies an appropriate time value base and parameters for use with the identified algorithm based on the distinguishing signature and request case (step 410). The Timing Renderer uses the identified algorithm, base, and parameters to calculate a time value (step 412). The Timing Renderer returns the time value identified in step 412 to the requesting component (step 414).

In one set of cases, the appropriate base time will always be either the Current Data Time or the Current Presentation Time, and there will be two relevant parameters: an incorrect offset (or differential) that the Timing Renderer anticipates the requesting component will add (or compute), and a correct offset (or differential) that the Timing Renderer anticipates that the requesting component intends to add (or compute). Frequently, the requesting component will employ an incorrect offset, or incorrectly calculate a differential, when the Current Time on which it is basing its calculation is the Data Time (Presentation Time), and the offset it intends to add, or differential it intends to calculate, is intrinsically the Presentation Time (Data Time).

Figure 5:
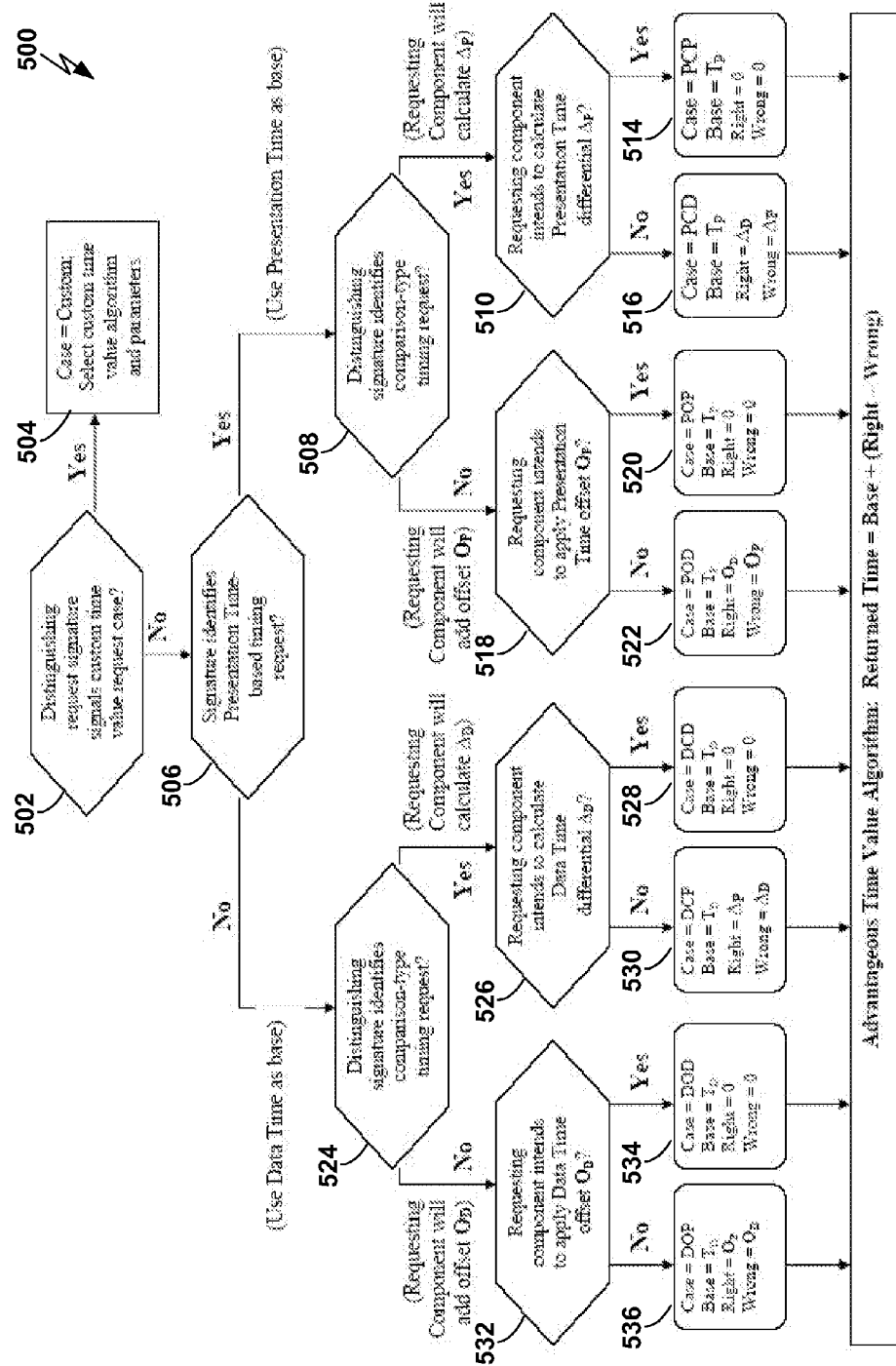
FIG. 5 is a flowchart of a method for satisfying a request for a Current Time according to another embodiment of the present invention.

In these cases, an advantageous method 500 for the Timing Renderer to employ in responding to the request is illustrated by the flowchart shown in FIG. 5. In general, in the method 500 the Timing Renderer determines, from the distinguishing signature of the request, which one of a number of standard time value request cases the current request is an instance of. Then, based on the identification of the time value request case, the Timing Renderer:

(A) selects either the current Data Time or the current Presentation Time as the correct base time;

(B) determines whether it is anticipated that the requesting component will add an incorrect offset to the time value returned, or calculate an erroneous differential from the time returned; and, if so, (C) adds to the base time value the correct offset or differential that the Timing Renderer anticipates, based on the request signature, that the requesting component intends to add or compute; and (D) subtracts from the base value the incorrect offset or differential that the Timing Renderer anticipates, based on the request signature, that the requesting component will actually add or compute.

More specifically, the method 500 determines whether the distinguishing request signature signals a custom time value request case (step 502). In one embodiment of the present invention, cases not falling within one of the set of cases described below with respect to steps 514, 516, 520, 522, 528, 530, 534, and 536 are regarded as custom cases for which custom time value calculation algorithms and parameters to perform those algorithms are identified on a case-by-case basis (step 504).

If the distinguishing request signature does not signal a custom time value request case, the method 500 determines whether the signature identifies a Presentation Time-based timing request (step 506). If the distinguishing request signature does identify a Presentation Time-based timing request, the method 500 uses Presentation Time as a base time. The method 500 determines whether the distinguishing request signature identifies a comparison-type timing request (step 508).

If the distinguishing request signature identifies a comparison-type timing request, the method 500 determines whether the intent of the calculation that the requesting component is expected to perform is to determine a Presentation Time differential $\Delta_P$ (step 510). If the requested component intends to calculate a Presentation Time differential, then the method 500 identifies the current case as the "PCP" case (step 514). The meaning of this case and other cases will be described in more detail below. If the intent of the calculation that the requesting component is expected to perform is to determine a Data Time differential $\Delta_D$, then the method 500 identifies the current case as the "PCD" case (step 516).

If the distinguishing request signature does not identify a comparison-type timing request, the method 500 determines whether the requesting component is expected to calculate a Presentation Time offset $O_P$ (step 518). If the requesting component is expected to calculate a Presentation Time offset, then the method 500 identifies the current case as the "POP" case (step 520). If the requesting component is not expected to calculate a Presentation Time offset, then the method 500 identifies the current case as the "POD" case (step 522).

Returning to step 506, if the distinguishing request signature does not identify a Presentation Time-based timing request, the method 500 uses Data Time as a base time. The method 500 determines whether the distinguishing request signature identifies a comparison-type timing request (step 524). If the distinguishing request signature identifies a comparison-type timing request, the method 500 determines whether the intent of the calculation that the requesting component is expected to perform is to determine a Data Time differential $\Delta_D$ (step 526). If the requesting component intends to calculate a Data Time differential, then the method 500 identifies the current case as the "DCD" case (step 528). If the intent of the calculation that the requesting component is expected to perform is to determine a Presentation Time differential $\Delta_P$, the method 500 identifies the current case as the "DCP" case (step 530).

Returning to step 524, if the distinguishing request signature does not identify a comparison-type timing request, the method 500 determines whether the requesting component is expected to calculate a Data Time offset $O_D$ (step 532). If the requesting component intends to calculate a Data Time offset, then the method 500 identifies the current case as the "DOD" case (step 534). If the requesting component intends to calculate a Presentation Time offset, then the method 500 identifies the current case as the "DOP" case (step 536).

For example, suppose that the requesting component is attempting to determine what the value of the Presentation Time was when the Data Time was 2.5 seconds earlier than the current moment. Further suppose that it determines this value by requesting the current time, and subtracting 2.5 seconds from the value returned. Consider the case in which the Presentation Rate r is now 2.0 (signifying a playback rate that is twice the default or normal playback rate), and has had that value for the past minute. Then the optimal value for the Timing Renderer to return is a value that is based on the Presentation Time. Further, the optimal value for the Timing Renderer to return (in seconds) is given by Equation 13.

$$T_O = T_P + (-2.5/r) - (-2.5) \qquad \text{Equation 13}$$

If the Timing Renderer returns $T_O$, and the requesting component adds an offset of (−2.5 seconds), the final number calculated will be given by Equation 14, which results in the desired value.

$$T_F = T_O - 2.5 = T_P + (-2.5/r) - (-2.5) + (-2.5) = T_P + (-2.5)/r \qquad \text{Equation 14}$$

In all of the cases mentioned above with respect to steps 514, 516, 520, 522, 528, 530, 534, and 536, three values are identified: a base time, a "right" offset, and a "wrong" offset. The "right" offset is an offset that, when added to the base time, returns an appropriate time value to return in response to the time request received by the Timing Renderer. The "wrong" offset is an offset that the Timing Renderer expects the requesting component to add to the time value returned by the Timing Renderer. To compensate for this expected "wrong" offset, the Timing Renderer returns a time value that is equal to the base time plus the right offset minus the wrong offset (step 538). If the requesting component adds the wrong offset to the returned value, as expected, the resulting value will be equal to the base time plus the right offset, which is the desired time value in response to the request.

For example, in the "DOP" case (step 536) the value desired by the requesting component when the Current Time is requested is the current Data Time, and the requesting component will intend to add a "right" Presentation Time offset $O_P$ to the value returned, but, it is anticipated, will add a "wrong" Data Time offset $O_D$. In this case, in one embodiment the Timing Renderer returns the current Data Time, plus the right offset $O_P$, minus the wrong offset $O_D$.

In the "DOD" case (step 534), the value desired by the requesting component when the Current Time is requested is the current Data Time, and the requesting component will intend to add a "right" Data Time offset $O_D$ to the value returned, and, it is anticipated, will actually add the proper offset. In this case, the in one embodiment the Timing Renderer returns the current Data Time, without any adjustment.

In the "DCP" case (step 530), the value desired by the requesting component when the Current Time is requested is the current Data Time, and the requesting component will compare the time returned with another Data Time value that differs by an amount $\Delta_D$, and, it is anticipated, will interpret the difference between those two values as Presentation Time differential $\Delta_P$. In this case, in one embodiment the Timing Renderer returns the current Data Time, plus the right differential $\Delta_P$, minus the wrong differential $\Delta_D$.

In the "DCD" case (step 528), the value desired by the requesting component when the Current Time is requested is the current Data Time, and the requesting component will compare the time returned with another Data Time value that differs by an amount $\Delta_D$, and, it is anticipated, will correctly interpret the difference between those two values as a Data Time differential. In this case, in one embodiment the Timing Renderer returns the current Data Time, without any adjustment.

In the "POP" case (step 520), the value desired by the requesting component when the Current Time is requested is the current Presentation Time, and the requesting component will intend to add a "right" Presentation Time offset $O_P$ to the value returned, and, it is anticipated, will actually add the proper offset. In this case, in one embodiment the Timing Renderer returns the current Presentation Time, without any adjustment.

In the "POD" case (step 522), the value desired by the requesting component when the Current Time is requested is the current Presentation Time, and the requesting component will intend to add a "right" Data Time offset $O_D$ to the value returned, but, it is anticipated, will add a "wrong" Presentation Time offset $O_P$. In this case, in one embodiment the Timing Renderer returns the current Presentation Time, plus the right offset $O_D$, minus the wrong offset $O_P$.

In the "PCD" case (step 516), the value desired by the requesting component when the Current Time is requested is the current Presentation Time, and the requesting component will compare the time returned with another Presentation Time value that differs by an amount $\Delta_P$, and, it is anticipated, will interpret the difference between those two values as Data Time differential $\Delta_D$. In this case, in one embodiment the Timing Renderer returns the current Presentation Time, plus the right differential $\Delta_D$, minus the wrong differential $\Delta_P$.

In the "PCP" case (step 514), the value desired by the requesting component when the Current Time is requested is the current Presentation Time, and the requesting component will compare the time returned with another Presentation Time value that differs by an amount $\Delta_P$, and, it is anticipated, will correctly interpret the difference between those two values as a Presentation Time differential. In this case, in one embodiment the Timing Renderer returns the current Presentation Time, without any adjustment.

In all cases for which the Timing Renderer calculates an offset or differential, any of the techniques discussed above for converting Data Times to Presentation Times, or Presentation Times to Data Times, may be employed as appropriate. In some cases the Timing Renderer may be able to predict that a requesting component will later attempt to identify the Data Time or Presentation Time associated with a moment that the Timing Renderer can identify. The Timing Renderer may choose to store either or both of the identified moment's Data Time and Presentation Time, and will be able to employ those stored times directly in computing a later "right" offset and "wrong" offset.

In some cases the values of $O_P$, $O_D$, $\Delta_P$, or $\Delta_D$ that a Timing Renderer might identify for a timing value request may not be equal to the actual values that the requesting component might employ following the request. It is frequently the case in engineered systems that exact values cannot be determined precisely, and components must use estimates of values. The values of $O_P$, $O_D$, $\Delta_P$, or $\Delta_D$ may be estimated using any appropriate techniques, including those that are well-known to those having ordinary skill in the art.

Figure 4:
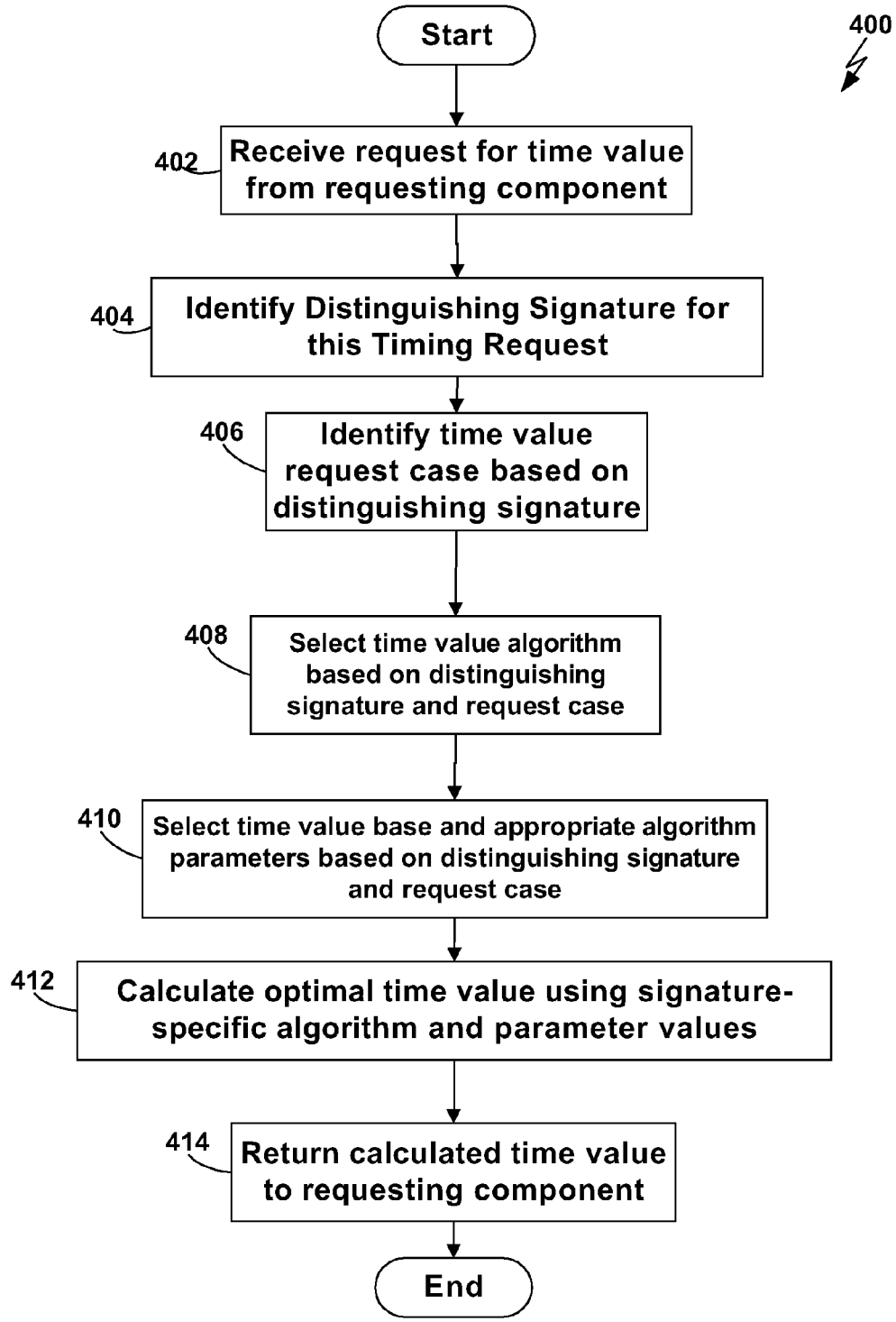
FIG. 4 is a flow chart of a method for satisfying a request for a Current Time according to one embodiment of the present invention.

As indicated above with respect to FIGS. 4-5, whenever a Timing Renderer receives a request for the Current Time, the Timing Renderer may determine which of the time value request cases this is an instance of, so as to be able to return an appropriate time value. The Timing Renderer may, for example, determine which case this request is an instance of by identifying a distinguishing signature associated with the current request, and using the distinguishing signature to identify a corresponding time value request case. Once the Timing Renderer has identified the corresponding time value request case, it may employ that identification to determine whether to base the return value on Data Time or Presentation Time. The Timing Renderer may also use the request case identification to determine how to adjust the selected base time. For instance, the Timing Renderer may base its estimate of $O_P$, $O_D$, $\Delta_P$, or $\Delta_D$ on the request signature and/or the request case.

The distinguishing signature may be identified from one or more properties of the request itself. In addition, properties related to the state of the player or other properties of the rendering system that are accessible to the Timing Renderer may contribute to the signature. The distinguishing signature may be an arbitrary combination of many properties, including but not limited to one or more of the following:

The return address of the subroutine call from the requesting component to the Timing Renderer (if the request is made via a subroutine call), or more generally a pattern present in the stack frame of the calling process or thread (for example the return address of the third subroutine back in the stack frame);

The specific subclass of the Timing Renderer through which the requesting component makes its request (in the case of an object-oriented request);

The identity of the message by which the timing request is made, if a message-passing protocol is used to make the timing request;

The identity of the execution thread or process within which the request is being made;

The phase, stage, or state of the player thread, process, or application when the timing request is made;

A distinguished or relevant pattern in the player memory;

A preference value set by the user or an external monitor program or tuning algorithm;

The number, timing, or specific pattern of prior calls to the Timing Renderer;

The name, source, encoding format, or other characteristic of the data currently being rendered;

The name of the program being executed, the user's name, or the identity or make of the computer on which the program is being executed;

A value accessible over the Internet, located in the memory of the computer running the player program, present on a hard disk or other data storage device, or otherwise directly or indirectly accessible to the Timing Renderer;

The state of a button, lever, slider, switch, or other input device directly or indirectly accessible to the Timing Renderer;

The hardware characteristics of the platform on which the program is running, including but not limited to the size of memory, the identity or characteristics of the processor, or the size of external storage; and The source of the data being rendered, or the nature of the channel between the data source and the player. For instance, in the case of media streaming over the Internet, the URL of the source material, or the capacity of the Internet connection, may constitute a factor.

Note that the term "property of the request" refers herein to any property from which the distinguishing signature of the request is derived. As the examples above indicate, such properties need not be represented in the request itself. For example, the state of any part of the rendering system may be treated as a "property of the request" for purposes of identifying the distinguishing signature of the request. The determination of the properties which comprise the distinguishing signature from which the time value request case is identified, and the determination of the time value parameters from which the final time value is calculated, may be accomplished in multiple ways, including but not limited to the following:

Examining the source code of the player program;

Analyzing the operating characteristics of the player program when playing media at various speeds;

Analyzing debugging output, error messages, and performance logs generated by the player program;

Providing a user interface by which users of the program may identify the properties which distinguish one request case from another, and by which users may specify the values of the time value parameters to be used with each request case;

Implementing an automatic optimization technique for traversing the search space of possible distinguishing properties and parameter values, identifying a metric for determining a goodness-of-fit value for each point in the search space, and running an optimization algorithm for identifying the best location in the search space.

Using any of the techniques above, or others that will occur to persons of ordinary skill in the art, a specification may be determined of relevant properties that together form a distinguishing request signature. The request signature then provides the mapping to a corresponding timing request case, and constitutes the means by which a corresponding set of time value parameters may be identified. The time value request case identity and the time value parameters together determine and fully specify the corresponding time value for the Timing Renderer to calculate and to return to the requesting component.

It is to be understood that although the invention has been described above in terms of particular embodiments, the foregoing embodiments are provided as illustrative only, and do not limit or define the scope of the invention. Various other embodiments, including but not limited to the following, are also within the scope of the claims. For example, elements and components described herein may be further divided into additional components or joined together to form fewer components for performing the same functions.

The techniques described above may be implemented, for example, in hardware, software, firmware, or any combination thereof. The techniques described above may be implemented in one or more computer programs executing on a programmable computer including a processor, a storage medium readable by the processor (including, for example, volatile and non-volatile memory and/or storage elements), at least one input device, and at least one output device. Program code may be applied to input entered using the input device to perform the functions described and to generate output. The output may be provided to one or more output devices.

Each computer program within the scope of the claims below may be implemented in any programming language, such as assembly language, machine language, a high-level procedural programming language, or an object-oriented programming language. The programming language may, for example, be a compiled or interpreted programming language.

Each such computer program may be implemented in a computer program product tangibly embodied in a machine-readable storage device for execution by a computer processor. Method steps of the invention may be performed by a computer processor executing a program tangibly embodied on a computer-readable medium to perform functions of the invention by operating on input and generating output. Suitable processors include, by way of example, both general and special purpose microprocessors. Generally, the processor receives instructions and data from a read-only memory and/or a random access memory. Storage devices suitable for tangibly embodying computer program instructions include, for example, all forms of non-volatile memory, such as semiconductor memory devices, including EPROM, EEPROM, and flash memory devices; magnetic disks such as internal hard disks and removable disks; magneto-optical disks; and CD-ROMs. Any of the foregoing may be supplemented by, or incorporated in, specially-designed ASICs (application-specific integrated circuits) or FPGAs (Field-Programmable Gate Arrays). A computer can generally also receive programs and data from a storage medium such as an internal disk (not shown) or a removable disk. These elements will also be found in a conventional desktop or workstation computer as well as other computers suitable for executing computer programs implementing the methods described herein, which may be used in conjunction with any digital print engine or marking engine, display monitor, or other raster output device capable of producing color or gray scale pixels on paper, film, display screen, or other output medium.

What is claimed is:

1. A method for use in conjunction with a rendering system which renders temporal sequence presentation data including a plurality of data samples organized into a plurality of buffers stored in a non-transitory computer-readable medium, wherein the plurality of buffers is logically arranged in an ordered sequence, the method performed by at least one computer processor executing computer program instructions stored on the non-transitory computer-readable medium, the method comprising steps of:
   (A) for each particular one of the plurality of buffers, calculating a data time corresponding to the particular one of the plurality of buffers based on a data time corresponding to the buffer previous to the particular one of the plurality of buffers in the ordered sequence;
   (B) for each particular one of the plurality of buffers, storing, in the non-transitory computer-readable medium, data representing the data time corresponding to the particular one of the plurality of buffers;
   (C) for each particular one of the plurality of buffers, storing, in the non-transitory computer-readable medium, data representing a presentation rate corresponding to the particular one of the plurality of buffers;
   (D) for each particular one of the plurality of buffers, presentation rate modifying the data samples that have been organized into the particular one of the plurality of buffers based on the presentation rate corresponding to the particular one of the plurality of buffers;
   (E) for each particular one of the plurality of buffers, calculating a presentation time corresponding to the particular one of the plurality of buffers based on a presentation time corresponding to a buffer previous to the particular one of the plurality of buffers in the ordered sequence; and
   (F) for each particular one of the plurality of buffers, storing, in the non-transitory computer-readable medium, data representing the presentation time corresponding to the particular one of the plurality of buffers.

2. The method of claim 1, wherein the step (A) comprises steps of, for each particular one of the plurality of buffers:
   (A)(1) identifying a data time corresponding to the buffer previous to the particular one of the plurality of buffers in the ordered sequence;
   (A)(2) identifying an unmodified cumulative rendition period of the buffer previous to the particular one of the plurality of buffers in the ordered sequence; and
   (A)(3) calculating the data time of the particular one of the plurality of buffers as a sum of the data time identified in step (A)(1) and the unmodified cumulative rendition period identified in step (A)(2).

3. The method of claim 1, wherein the step (E) comprises steps of, for each particular one of the plurality of buffers:
   (E)(1) identifying a presentation time corresponding to the buffer previous to the particular one of the plurality of buffers in the ordered sequence;
   (E)(2) identifying a modified cumulative rendition period of the buffer previous to the particular one of the plurality of buffers in the ordered sequence; and
   (E)(3) calculating the presentation time of the particular one of the plurality of buffers as a sum of the presentation time identified in step (E)(1) and the modified cumulative rendition period identified in step (E)(2).

4. The method of claim 3, wherein (E)(2) comprises:
   (E)(2) (a) identifying the number of samples in the buffer previous to the particular one of the plurality of buffers after presentation rate modifying the data samples that have been organized into the buffer previous to the particular one of the plurality of buffers;
   (E)(2)(b) identifying a modified rendition period of a sample in the buffer previous to the particular one of the plurality of buffers; and
   (E)(2)(c) calculating a modified cumulative rendition period of the buffer previous to the particular one of the plurality of buffers as a product of the number of samples identified in step (E)(2)(a) times the modified rendition period of the sample in the buffer previous to the particular one of the plurality of buffers identified in step (E)(2)(b).

5. The method of claim 4, wherein the modified rendition period of the sample in the buffer previous to the particular one of the plurality of buffers is equal to the unmodified rendition period of that sample.

6. The method of claim 2, wherein (A)(2) comprises:
   (A)(2)(a) identifying the number of samples in the buffer previous to the particular one of the plurality of buffers before presentation rate modifying the data samples that have been organized into the buffer previous to the particular one of the plurality of buffers;
   (A)(2)(b) identifying an unmodified rendition period of a sample in the buffer previous to the particular one of the plurality of buffers; and
   (A)(2)(c) calculating an unmodified cumulative rendition period of the buffer previous to the particular one of the plurality of buffers as a product of the number of samples identified in step (A)(2)(a) times the unmodified rendition period of the sample in the buffer previous to the particular one of the plurality of buffers identified in step (A)(2)(b).

7. A non-transitory computer-readable medium comprising computer program instructions executable by at least one computer processor to perform a method for use in conjunction with a rendering system which renders temporal sequence presentation data including a plurality of data samples organized into a plurality of buffers stored in the non-transitory computer-readable medium, wherein the plurality of buffers is logically arranged in an ordered sequence, the method comprising steps of:
  (A) for each particular one of the plurality of buffers, calculating a data time corresponding to the particular one of the plurality of buffers based on a data time corresponding to the buffer previous to the particular one of the plurality of buffers in the ordered sequence;
  (B) for each particular one of the plurality of buffers, storing, in the non-transitory computer-readable medium, data representing the data time corresponding to the particular one of the plurality of buffers;
  (C) for each particular one of the plurality of buffers, storing, in the non-transitory computer-readable medium, data representing a presentation rate corresponding to the particular one of the plurality of buffers;
  (D) for each particular one of the plurality of buffers, presentation rate modifying the data samples that have been organized into the particular one of the plurality of buffers based on the presentation rate corresponding to the particular one of the plurality of buffers;
  (E) for each particular one of the plurality of buffers, calculating a presentation time corresponding to the particular one of the plurality of buffers based on a presentation time corresponding to a buffer previous to the particular one of the plurality of buffers in the ordered sequence; and
  (F) for each particular one of the plurality of buffers, storing, in the non-transitory computer-readable medium, data representing the presentation time corresponding to the particular one of the plurality of buffers.

8. The computer-readable medium of claim 7, wherein the step (A) comprises steps of, for each particular one of the plurality of buffers:
  (A)(1) identifying a data time corresponding to the buffer previous to the particular one of the plurality of buffers in the ordered sequence;
  (A)(2) identifying an unmodified cumulative rendition period of the buffer previous to the particular one of the plurality of buffers in the ordered sequence; and
  (A)(3) calculating the data time of the particular one of the plurality of buffers as a sum of the data time identified in step (A)(1) and the unmodified cumulative rendition period identified in step (A)(2).

9. The computer-readable medium of claim 7, wherein the step (E) comprises steps of, for each of the plurality of buffers:
  (E)(1) identifying a presentation time corresponding to the buffer previous to the particular one of the plurality of buffers in the ordered sequence;
  (E)(2) identifying a modified cumulative rendition period of the buffer previous to the particular one of the plurality of buffers in the ordered sequence; and
  (E)(3) calculating the presentation time of the particular one of the plurality of buffers as a sum of the presentation time identified in step (E)(1) and the modified cumulative rendition period identified in step (E)(2).

10. The computer-readable medium of claim 9 wherein the method further comprises, wherein step (E)(2) comprises, for each particular one of the plurality of buffers:
  (E)(2)(a) identifying the number of samples in the particular one of the plurality of buffers after presentation rate modifying the data samples that have been organized into the particular one of the plurality of buffers;
  (E)(2)(b) identifying a modified rendition period of a sample in the particular one of the plurality of buffers; and
  (E)(2)(c) calculating a modified cumulative rendition period of the particular one of the plurality of buffers as a product of the number of samples identified in step (E)(2)(a) times the modified rendition period of the sample in the particular one of the plurality of buffers identified in step (E)(2)(b).

11. The computer-readable medium of claim 10, wherein the modified rendition period of the sample in the buffer previous to the particular one of the plurality of buffers is equal to the unmodified rendition period of that sample.

12. The computer-readable medium of claim 8, wherein (A)(2) comprises:
  (A)(2)(a) identifying the number of samples in the buffer previous to the particular one of the plurality of buffers before presentation rate modifying the data samples that have been organized into the buffer previous to the particular one of the plurality of buffers;
  (A)(2)(b) identifying an unmodified rendition period of a sample in the buffer previous to the particular one of the plurality of buffers; and
  (A)(2)(c) calculating an unmodified cumulative rendition period of the buffer previous to the particular one of the plurality of buffers as a product of the number of samples identified in step (A)(2)(a) times the unmodified rendition period of the sample in the buffer previous to the particular one of the plurality of buffers identified in step (A)(2)(b).

* * * * *

UNITED STATES PATENT AND TRADEMARK OFFICE
CERTIFICATE OF CORRECTION

| | | |
|---|---|---|
| PATENT NO. | : 8,797,329 B2 | Page 1 of 1 |
| APPLICATION NO. | : 13/454877 | |
| DATED | : August 5, 2014 | |
| INVENTOR(S) | : Richard S. Goldhor et al. | |

It is certified that error appears in the above-identified patent and that said Letters Patent is hereby corrected as shown below:

Title Page, in the References Cited

On page 2, in column 2, under "Other Publications", line 20, delete "Pkocessing," and insert -- Processing, --, therefor.

On page 4, in column 2, under "Other Publications", line 28, delete "Machne" and insert -- Machine --, therefor.

On page 4, in column 2, under "Other Publications", line 45, delete "TRr" and insert -- TR --, therefor.

On page 9, in column 2, under "Other Publications", line 31, delete "Acolistics," and insert -- Acoustics, --, therefor.

In the Specification

Column 10, line 50, delete "that that" and insert -- that --, therefor.

Signed and Sealed this
Second Day of December, 2014

Michelle K. Lee
*Deputy Director of the United States Patent and Trademark Office*